US009198108B2

(12) United States Patent
Aminaka

(10) Patent No.: US 9,198,108 B2
(45) Date of Patent: Nov. 24, 2015

(54) MOBILE COMMUNICATION SYSTEM, RELAY-STATION MOBILITY MANAGEMENT APPARATUS, RELAY-STATION MOBILITY CONTROL METHOD, AND COMPUTER-READABLE MEDIUM

(75) Inventor: Hiroaki Aminaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 164 days.

(21) Appl. No.: 13/981,190

(22) PCT Filed: Oct. 28, 2011

(86) PCT No.: PCT/JP2011/006041
§ 371 (c)(1),
(2), (4) Date: Jul. 23, 2013

(87) PCT Pub. No.: WO2012/104939
PCT Pub. Date: Aug. 9, 2012

(65) Prior Publication Data
US 2013/0301520 A1 Nov. 14, 2013

(30) Foreign Application Priority Data

Feb. 3, 2011 (JP) ................................. 2011-021932

(51) Int. Cl.
*H04W 36/00* (2009.01)
*H04W 40/36* (2009.01)
(Continued)

(52) U.S. Cl.
CPC ........... *H04W 36/32* (2013.01); *H04B 7/15507* (2013.01); *H04W 36/08* (2013.01); *H04B 7/2606* (2013.01); *H04W 36/18* (2013.01); *H04W 40/36* (2013.01); *H04W 84/047* (2013.01)

(58) Field of Classification Search
CPC . H04B 7/2606; H04B 7/15507; H04W 36/18; H04W 36/30; H04W 40/12; H04W 40/22; H04W 40/24; H04W 36/32; H04W 36/08; H04W 40/36; H04W 84/047
See application file for complete search history.

(56) References Cited

U.S. PATENT DOCUMENTS 8,576,753 B2 * 11/2013 Senarath et al. ............... 370/279
8,774,014 B2 * 7/2014 Seo et al. ....................... 370/246

FOREIGN PATENT DOCUMENTS

| JP | 2011-004374 A | 1/2011 |
| JP | 2011-015317 A | 1/2011 |
| RU | 2342800 C2 | 12/2008 |

OTHER PUBLICATIONS

3GPP TR36.912 v9.2.0 ,"3rd Generation Partnership Project; Technical Specification Group Radio Access Network; Feasibility study for Further Advancements for E-UTRA (LTE-Advanced) (Release 9)", Mar. 2010.
(Continued)

*Primary Examiner* — Ayaz Sheikh
*Assistant Examiner* — Debebe Asefa
(74) *Attorney, Agent, or Firm* — Sughrue Mion, PLLC

(57) ABSTRACT

The second data transfer unit (RN S/P-GW 8) terminates a relay-station data bearer provided between a relay station (RN 2) and the second data transfer unit, and transfers user data between a first data transfer unit (UE S/P-GW 6) and the relay station (RN 2) by associating a mobile-station data bearer provided between the mobile station (RN-UE 3) and the first data transfer unit (UE S/P-GW 6) with the relay-station data bearer. When a belonging destination of the relay station (RN 2) is changed from the first base station (DeNB 1-1) to the second base station (DeNB 1-2), a relay-station mobility management unit (RN MME 7) changes a path of the relay-station data bearer, which is terminated by the relay station (RN 2) and the second data transfer unit (RN S/P-GW 8), so as to pass through the second base station (DeNB 1-2). It is thereby possible, for example, to change base stations without interrupting communication of a mobile station (RN-UE 3) during operation of a relay node cell.

29 Claims, 24 Drawing Sheets

(51) Int. Cl.
*H04W 84/04* (2009.01)
*H04W 36/32* (2009.01)
*H04W 36/08* (2009.01)
*H04B 7/26* (2006.01)
*H04B 7/155* (2006.01)
*H04W 36/18* (2009.01)

(56) References Cited

OTHER PUBLICATIONS

3GPP TR36.806 v9.0.0, "3rd Generation Partnership Project; Technical Specification Group Radio Access Network; Evolved Universal Terrestrial Radio Access (E-UTRA); Relay architectures for E-UTRA (LTE-Advanced) (Release 9)", Mar. 2010.

3GPP contribution R1-082975, "Application Scenarios for LTE-Advanced Relay", China Mobile, Vodafone, Huawei, Aug. 2008.
International Search Report of PCT/JP2011/006041 dated Dec. 20, 2011.
Huawei, "Mobile Relay Support Analysis", 3GPP TSG RAN WG3#65, Aug. 24-28, 2009, 5 pgs.
Ericsson, "Support for Nomadic Relay-eNB-s", 3GPP TSG-RAN WG3#66bis, Jan. 18-22, 2010, 2 pgs.
Communication dated Oct. 29, 2014, from the Russian Patent Office, in counterpart Application No. 2013140575/07(061755).
Huawei, "EPC impact for different Relay architecture", 3GPP TSG SA WG2 Meeting #76, TD S2-096650, Nov. 16, 2009.
Communication dated Jul. 28, 2015 from the Japanese Patent Office in counterpart application No. 2012-555576.

* cited by examiner

MOBILE COMMUNICATION SYSTEM, RELAY-STATION MOBILITY MANAGEMENT APPARATUS, RELAY-STATION MOBILITY CONTROL METHOD, AND COMPUTER-READABLE MEDIUM

CROSS REFERENCE TO RELATED APPLICATIONS

This is a National Stage of International Application No. PCT/JP2011/006041 filed Oct. 28, 2011, claiming priority based on Japanese Patent Application No. 2011-021932 filed Feb. 3, 2011, the contents of all of which are incorporated herein by reference in their entirety.

TECHNICAL FIELD

The present invention relates to, in a system including a base station and a relay station belonging to the base station, a method for controlling the mobility of the relay station which includes changing the bearer path when the relay station changes the base station to which the relay station belongs.

BACKGROUND ART

The introduction of a relay station (hereafter referred to as relay node (RN)) into the Long Term Evolution Advanced (LTE-Advanced) of the 3rd Generation Partnership Project (3GPP) is being considered (see Non-Patent Literatures 1 to 3). RN is one of technologies which aim at an increase in the communication speed of a mobile station (hereafter referred to as user equipment (UE)) located at the cell edge, an increase in the cell range of a base station (hereafter referred to as evolved node B (eNB)), or the like. Details of an RN architecture which is being considered in the 3GPP are described in Non-Patent Literature 2.

Hereafter, an outline of a RN system based on the RN architecture described in Non-Patent Literature 2 will be described using FIGS. 1 and 2. FIG. 1 is a diagram showing an example network configuration where an RN of the 3GPP is used. Base stations (eNBs) 91 belongs to a core network (hereafter referred to as CN) 4 of a mobile network operator. The core network (CN) 4 includes a mobility management entity for UE (hereafter referred to as UE MME) 5, a serving gateway/packet data network gateway for UE (hereafter referred to as UE S/P-GW) 6, and an MME for RN (hereafter referred to as RN MME) 97. The UE S/P-GW 6 is a generic name of an S-GW for UE and a P-GW for UE.

The S-GW for UE and P-GW for UE have the functions of routing and forwarding user data (user data packets). The S-GW for UE connects the user plane between the core network 4 and a radio access network to which the base stations (eNBs) 91 and the mobile stations (UEs) 3 belong. The P-GW for UE operates as a gateway that connects the core network 4 with an external network (i.e., packet data network (PDN)). When a relay station (RN) 92 is introduced, the UE S/P-GW 6 maps user data (user packets) about the mobile station (UE) 3 belonging to the relay station (RN) 92 to a logical path (tunnel) provided between the UE S/P-GW 6 and an RN S/P-GW 98 described below and sends the user data to the relay station (RN) 92 through the RN S/P-GW 98.

The UE MME 5 is a node that is responsible for the mobility management and session management (bearer management) of the mobile stations (UE) 3. The UE MME 5 is connected with the base stations (eNB) 91 and the S-GW for UE through the control plane. The UE MME 5 exchanges, with the base stations (eNB) 91 and the S-GW for UE, control signals about an attachment of the UE 3, a handover of the UE 3, and establishment, modification and release of a bearer (evolved packet system (EPS) bearer) for transferring user data between the UE S/P-GW 6 and the UE 3.

The RN MME 97 manages an attachment of the relay station (RN) 92 and a bearer of the relay station (RN) 92.

The radio access network (RAN) 9 includes the base station (eNB) 91, the relay station (RN) 92, and the mobile station (UE) 3. The base station (eNB) 91 generates a base station (eNB) cell 10 and relays traffic between the mobile station (UE) 3 and the core network (CN) 4. The relay station (RN) 92 belongs to the base station (eNB) 91 by a backhaul link (BL1 in FIG. 1), and belongs to the core network (CN) 4 through the backhaul link (BL1). The mobile station (UE) 3 belongs to the base station (eNB) 91 or the relay station (RN) 92 by an access link (AL1 in FIG. 1). The relay station (eNB) 92 generates a relay station (RN) cell 20 and relays traffic between the mobile stations (UE) 3 and the core network (CN) 4. The backhaul link and access link will be described later.

FIG. 2 is a diagram showing bearer mapping when the relay station (RN) 92 and the mobile station (UE) 3 belonging to the relay station (RN) 92 are connected to the network of FIG. 1. As shown in FIG. 2, it is assumed that the functions of S-GW for RN and P-GW for RN are part of the logical function of the base station (eNB) 91 (i.e., these functions are placed in the base station (eNB) 91). However, this only means logical layout of functions, and the base station (eNB) 91 and the functions of S-GW for RN and P-GW for RN do not necessarily need to be implemented in the same hardware. Hereafter, the S-GW for RN and P-GW for RN will be collectively referred to as the RN S/P-GW 98.

The RN MME 97 and RN S/P-GW 98 are network elements which are introduced with the introduction of the relay station (RN) 92. The RN S/P-GW 98 establishes a logical path (tunnel) with the UE S/P-GW 6 and transfers, to the relay station (RN) 92 through the base station (eNB) 91, user data about the mobile station (UE) 3 belonging to the relay station (RN) 92.

When the relay station (RN) 92 belongs to the base station (eNB) 91, a signaling radio bearer (SRB) and a data radio bearer (DRB) for the RN 92 are established between the base station (eNB) 91 and the relay station (RN) 92. The signaling radio bearer for the RN 92 is mapped, by the base station (eNB) 91, to a control protocol (i.e., S1 MME) established between the RN MME 97 and the base station (eNB) 91. That is, with respect to the control plane (i.e., S1 signaling connection) of the relay station (RN) 92, the relay station (RN) 92 is handled as a UE. On the other hand, the data radio bearer for the RN 92 is mapped to a data bearer (S1 bearer) established between the S-GW for RN and the base station (eNB) 91, and is finally terminated by the P-GW for RN. However, as described above, it is assumed that the functions of the RN S/P-GW 98 are placed in the base station (eNB) 91. Accordingly, the data bearer for RN is substantially terminated in the base station (eNB) 91.

When the mobile station (UE) 3 belongs to the relay station (RN) 92, a signaling radio bearer (SRB) and data radio bearer (DRB) for the UE 3 are established between the mobile station (UE) 3 and the relay station (RN) 92. The signaling radio bearer for UE 3 is mapped to the data radio bearer for the RN 92 by the relay station (RN) 92, and is terminated by the UE MME 5 through the RN S/P-GW 98. The data radio bearer for the UE 3 is mapped to the data radio bearer for the RN 92 by the relay station (RN) 92, passes through the RN S/P-GW 98 and the S-GW for UE, and is finally terminated by the P-GW for UE. In other words, control packets transferred between the UE MME 5 and the UE 3 and user data packets transferred between the UE S/P-GW 6 and the UE 3 are both transferred using the data bearer for the RN 92 provided between the RN 92 and the RN S/P-GW 98 (i.e., the data radio bearer between the RN 92 and the eNB 91 and the GTP tunnel between the eNB 91 and the RN S/P-GW 98).

Note that, the 3GPP release 10 assumes that while the relay station (RN) 92 relays the traffic of the mobile station (UE) 3 (in other words, while the RN cell 20 is in operation), the relay station (RN) 92 belongs any one base station (eNB) 91 fixedly and does not change the base station (eNB) to which the relay station (RN) 92 belongs. On the other hand, Non-Patent Literature 3 describes a scenario (mobile RN) in which an RN is mounted on public transportation, such as a train or bus, and thus moves. However, Non-Patent Literature 3 only states that an S1 interface needs to be further considered to realize a mobile RN and does not disclose a specific embodiment.

In the present specification, an eNB having a function of permitting an RN to belong thereto is referred to as "donor eNB (DeNB)." Note that in the present specification, only when describing an event specific to a DeNB which is related to connection with an RN, the term "DeNB" is used to distinguish from a typical eNB. Also, in the present specification, a UE belonging to a DeNB is referred to as "eNB-UE," and a UE belonging to a RN is referred to as "RN-UE." In the present specification, when describing an event common to an eNB-UE and an RN-UE, these are simply referred to as "UEs." In discussions about the 3GPP, a need for supporting a multi-hop RN in the future is being discussed. The term multi-hop RN refers to a technology which allows an RN belonging to a DeNB to be cascaded to another RN. In the present specification, when describing a multi-hop, an RN belonging to a DeNB through a radio interface is referred to as "upper RN," and an RN belonging to the upper RN through a radio interface is referred to as "lower RN" to distinguish therebetween.

In the present specification, a radio interface between a DeNB and an RN and a radio interface between an upper RN and a lower RN are referred to as "backhaul links." On the other hand, a radio interface between an eNB and an eNB-UE and a radio interface between an RN and an RN-UE are referred to as "access links."

CITATION LIST

Non Patent Literature

[Non-Patent Literature 1] 3GPP TR36.912 v9.2.0 (2010-03), "Feasibility study for Further Advancements for E-UTRA (LTE-Advanced)"
[Non-Patent Literature 2] 3GPP TR36.806 v9.0.0 (2010-03), "Relay architectures for E-UTRA (LTE-Advanced)"
[Non-Patent Literature 3] 3GPP contribution R1-082975 "Application Scenarios for LTE-Advanced Relay," August, 2008

SUMMARY OF INVENTION

Technical Problem

The inventor of the present application has given detailed consideration to a method for controlling a bearer when introducing a mobile RN as presented in Non-Patent Literature 3, or an RN that changes the DeNB to which the RN belongs in accordance with a change in the radio quality of the backhaul link, in an RN architecture defined by the current 3GPP. As described above, a data bearer for RN is terminated by an RN S/P-GW which is part of the logical function of a DeNB. Accordingly, when the RN changes the DeNB to which the RN belongs, it also needs to change the RN S/P-GW. Since the change of the RN S/P-GW changes the termination point of the data bearer for RN, the data bearer for RN is released. The release of the data bearer for the RN causes the release of a signaling bearer and a data bearer for an RN-UE which are mapped to the data bearer for the RN. As a result, there occurs a problem that communication of the RN-UE may be interrupted.

The present invention has been made in view of the foregoing problem, and an object thereof is to provide a mobile communication system, relay-station mobility management apparatus, relay-station mobility control method, and program that allow an RN to change a DeNB to which it belongs, without interrupting communication of an RN-UE during operation of an RN cell.

Solution to Problem

A first aspect of the present invention includes a mobile communication system. The mobile communication system includes first and second base stations, a relay station, first and second data transfer units, a relay-station mobility management unit. The relay station is capable of belonging to the first and second base stations and performs radio relay between a mobile station and the first or second base station. The first data transfer unit terminates a mobile-station data bearer provided between the mobile station and the first data transfer unit through the relay station, and transfers user data to the mobile station using the mobile-station data bearer. The second data transfer unit terminates a relay-station data bearer provided between the relay station and the second data transfer unit, and transfers the user data between the first data transfer unit and the relay station by associating the mobile-station data bearer with the relay-station data bearer. When a belonging destination of the relay station is changed from the first base station to the second base station, the relay-station mobility management unit changes a path of the relay-station data bearer, which is terminated by the relay station and the second data transfer unit, so as to pass through the second base station.

A second aspect of the present invention includes a relay-station mobility management apparatus that performs control of a mobile communication network. The mobile communication network includes first and second base stations, and a relay station that is capable of belonging to the first and second base stations and performs radio relay between a mobile station and the first or second base station. The mobile communication network also includes a first data transfer unit that terminates a mobile-station data bearer provided between the mobile station and the first data transfer unit through the relay station, and that transfers user data to the mobile station using the mobile-station data bearer. The mobile communication network further also includes a second data transfer unit that terminates a relay-station data bearer provided between the relay station and the second data transfer unit, and that transfers the user data between the first data transfer unit and the relay station by associating the mobile-station data bearer with the relay-station data bearer. The relay-station mobility management apparatus is configured to, when a belonging destination of the relay station is changed from the first base station to the second base station, change a path of the relay-station data bearer, which is terminated by the relay station and the second data transfer unit, so as to pass through the second base station.

A third aspect of the present invention includes a relay-station mobility control method performed by the relay-station mobility management apparatus according to the above-mentioned second aspect of the present invention. That is, the method includes, when a belonging destination of the relay station is changed from the first base station to the second base station, changing a path of the relay-station data bearer, which is terminated by the relay station and the second data transfer means, so as to pass through the second base station.

A Fourth aspect of the present invention includes a program for causing a computer to execute the method according to the above-mentioned third aspect of the present invention.

Advantageous Effects of Invention

According to above aspects of the present invention, it is possible to provide a mobile communication system, relay-station mobility management apparatus, relay-station mobility control method, and program that allow an RN to change a DeNB to which it belongs, without interrupting communication of an RN-UE during operation of an RN cell.

DESCRIPTION OF EMBODIMENTS

Figure 1:
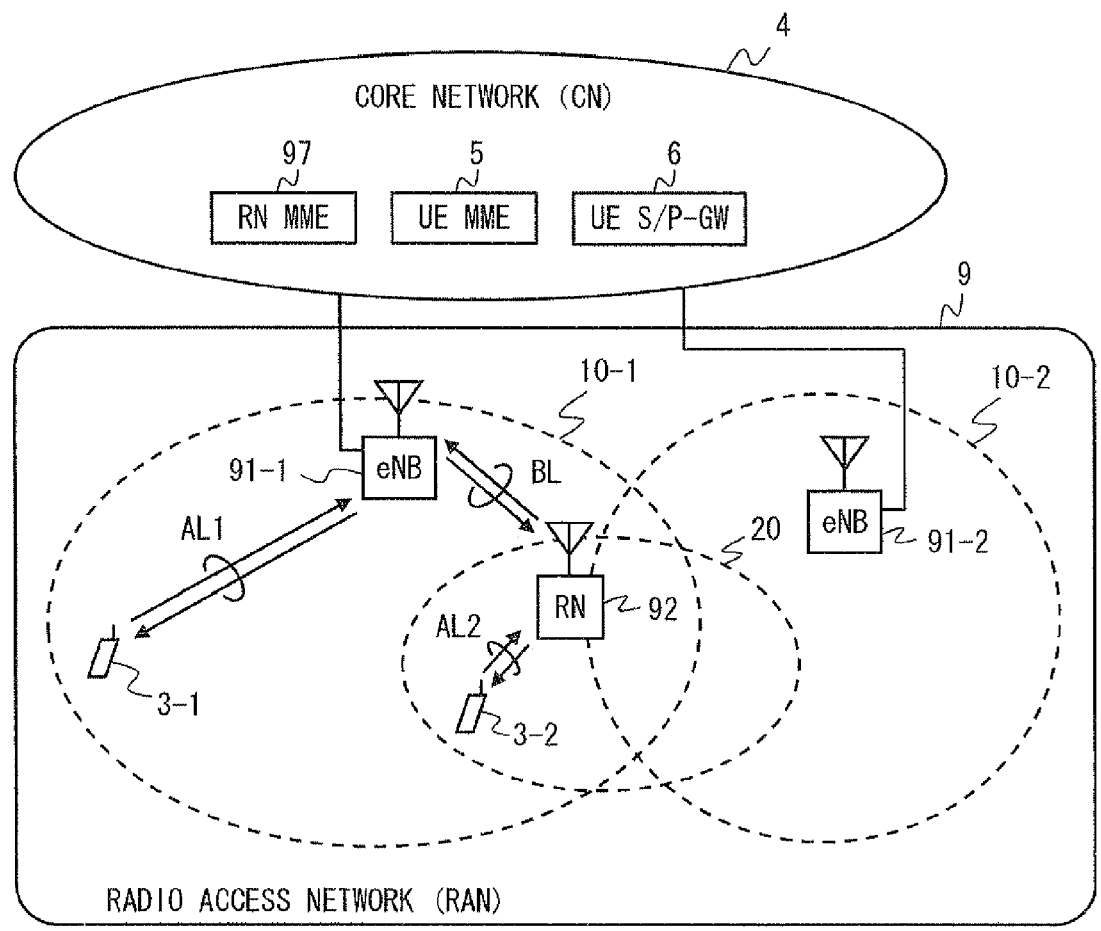
FIG. 1 is a block diagram showing an example configuration of a 3GPP mobile communication system including an RN according to the related art.
Figure 2:
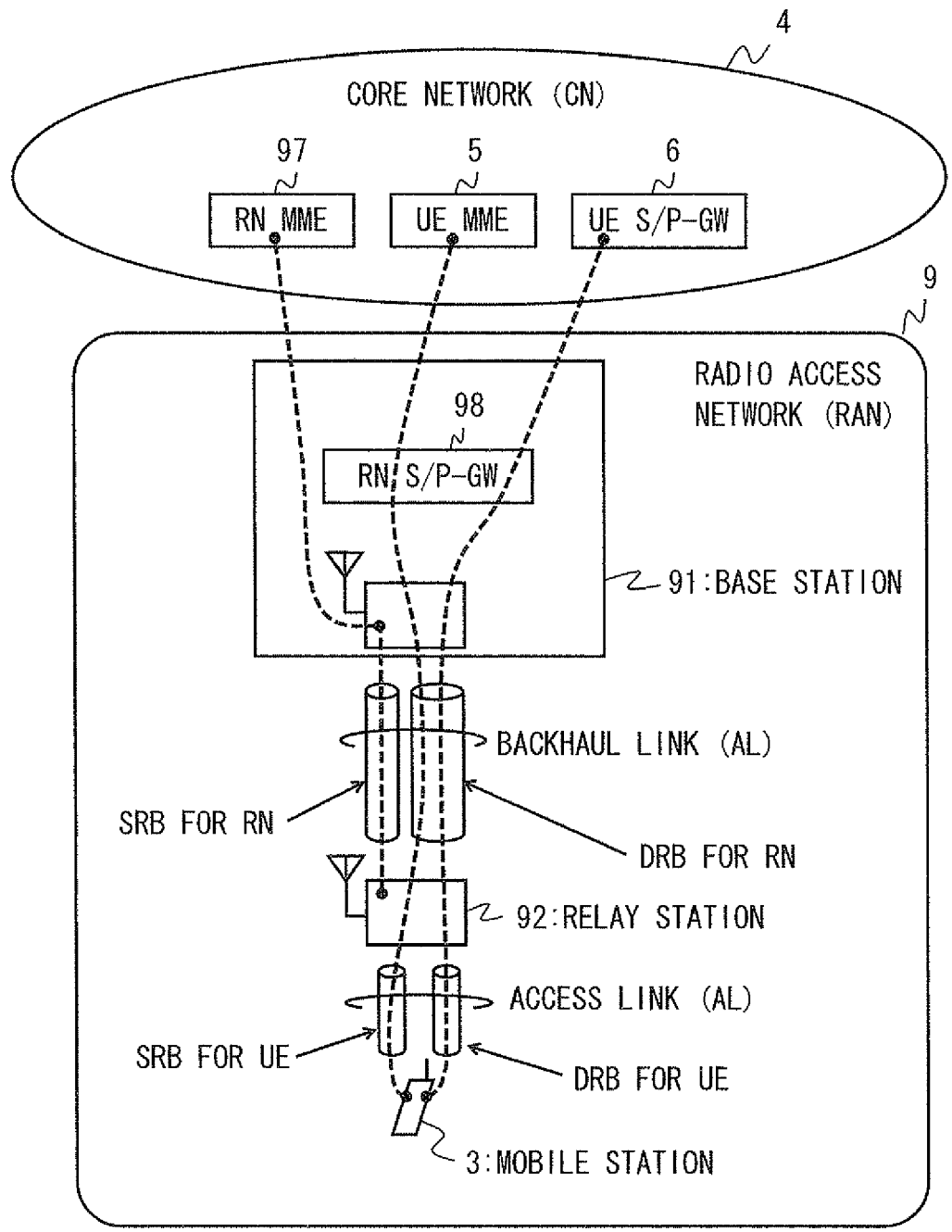
FIG. 2 is a diagram showing bearer allocation to the RN and RN-UE according to the related art.

Hereinafter, specific embodiments of the present invention will be described in detail with reference to the drawings. In the drawings, the same or corresponding components are given the same reference signs, and repeated description thereof will be omitted as necessary to clarify the description.

First Embodiment

Figure 3:
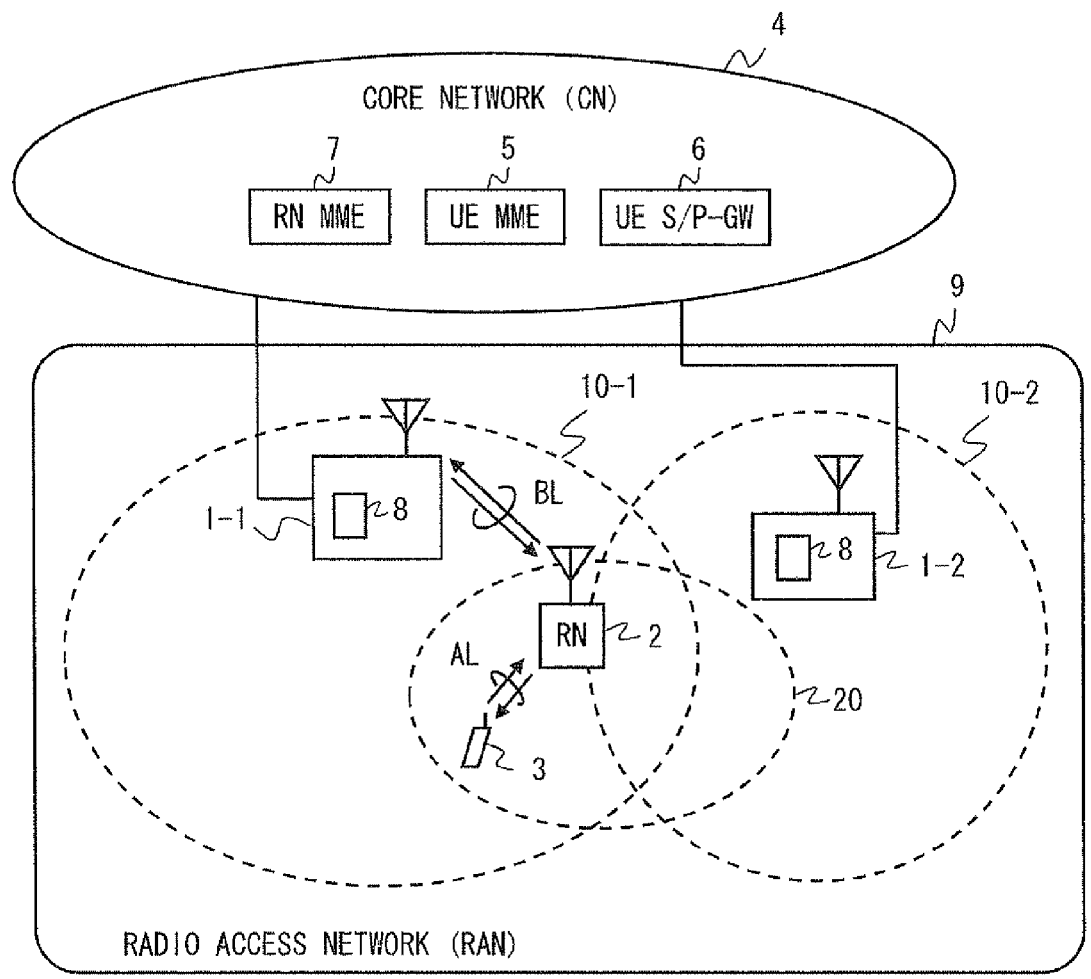
FIG. 3 is a block diagram showing an example configuration of a mobile communication system according to a first embodiment of the present invention.

FIG. 3 is a block diagram showing an example configuration of a mobile communication system according to the present embodiment. In the description below, it is assumed that the mobile communication system according to the present embodiment is a frequency division duplex (FDD)-OFDMA, more specifically, an LTE-Advanced mobile communication system based on LTE. In FIG. 3, a base station 1 belongs to a core network 4 of a mobile network operator and relays traffic between a mobile station 3 and the core network 4. The base station 1 permits a relay station 2 to belong thereto, and also the mobile station 3. The core network 4 includes a UE MME 5, a UE S/P-GW 6, and an RN MME 7.

In the present embodiment, the base station (eNB) 1 is provided with the functions of an RN S/P-GW 8. When the RN 2 changes the DeNB to which it belongs, from the source base station (DeNB 1-1) to the target base station (DeNB 1-2), an RN S/P-GW 8 provided in the source base station (DeNB 1-1) operates as a mobility anchor point. According to the configuration and operation described above, even when the relay station (RN) 2 moves between the base stations (DeNBs) 1, there is no need to change the RN S/P-GW 8 terminating a data bearer for the RN 2. As a result, it is possible to change the DeNB while keeping communication of an RN-UE 3, without releasing the data bearer for the RN 2, a signaling bearer for the RN-UE 3 and a data bearer for the RN-UE 3. Note that the source base station and the target base station may be connected together through an inter-base station interface, such as an X2 interface.

In an example shown in FIG. 3, the target base station (DeNB 1-2) is also provided with the RN S/P-GW 8. However, the data bearer for the RN 2 is terminated by the source base station (DeNB 1-1). Accordingly, the target base station (DeNB 1-2) does not need to have some or all of the functions of the RN S/P-GW 8. For example, the target base station (DeNB 1-2) may have an S-GW function for the RN but not a P-GW function for the RN.

Figure 4:
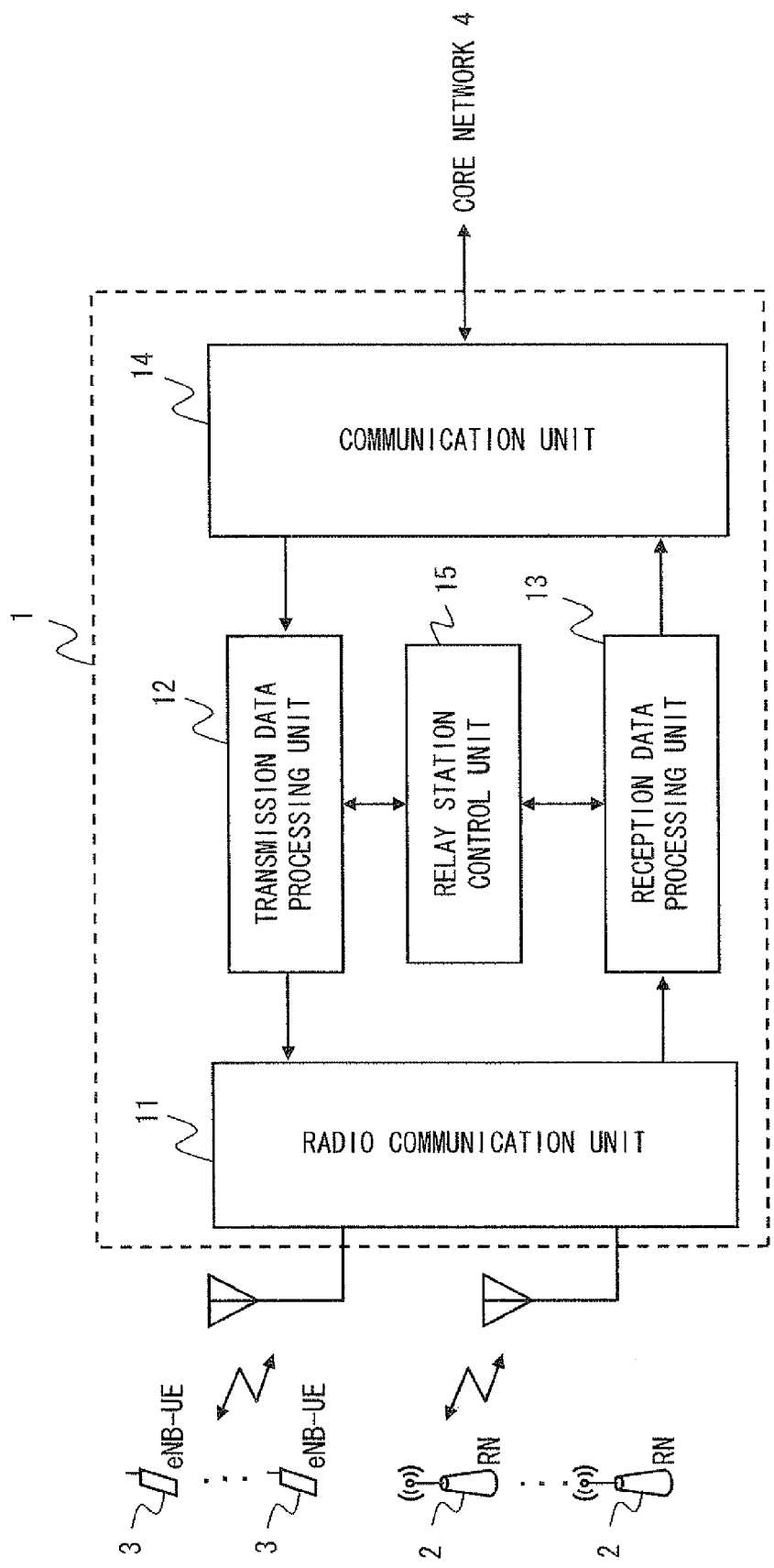
FIG. 4 is a block diagram showing an example configuration of a base station according to the first embodiment of the present invention.

Hereafter, the configuration and operation of the mobile communication system according to the present embodiment will be described in detail. FIG. 4 is a block diagram showing an example configuration of the base station 1 according to the first embodiment. Referring to FIG. 4, a radio communication unit 11 generates a downlink signal by performing processes, such as mapping to resource elements, generation of an OFDM signal (i.e. inverse discrete Fourier transform (IDFT)), frequency conversion, and signal amplification, on the transmission symbol sequence of a physical channel supplied from a transmission data processing unit 12. The generated downlink signal is wirelessly transmitted from an antenna. The radio communication unit 11 also receives an uplink signal transmitted from the mobile station 3 or the relay station 2, and restores a reception symbol sequence.

The transmission data processing unit 12 stores data obtained from a communication unit 14 and destined for the mobile station 3 or the relay station 2, in a buffer which is set for each mobile station and for each bearer, and generates a transport channel by performing error-correction coding, rate matching, interleaving, or the like. Further, the transmission data processing unit 12 adds control information to the data sequence of the transport channel to generate a radio frame. Furthermore, the transmission data processing unit 12 generates a transmission symbol sequence for each physical channel by performing scrambling and modulation symbol mapping on the data sequence of the radio frame.

A received data processing unit 13 restores the received data for each logical channel from the reception symbol sequence supplied from the radio communication unit 11. User traffic data and a part of control data included in the obtained received data are transferred to the core network 4 through the communication unit 14.

A relay station control unit 15 controls transmission timing and radio resource allocation about data to be transmitted to the mobile station 3 and the relay station 2, and also controls information about a backhaul link.

Figure 5:
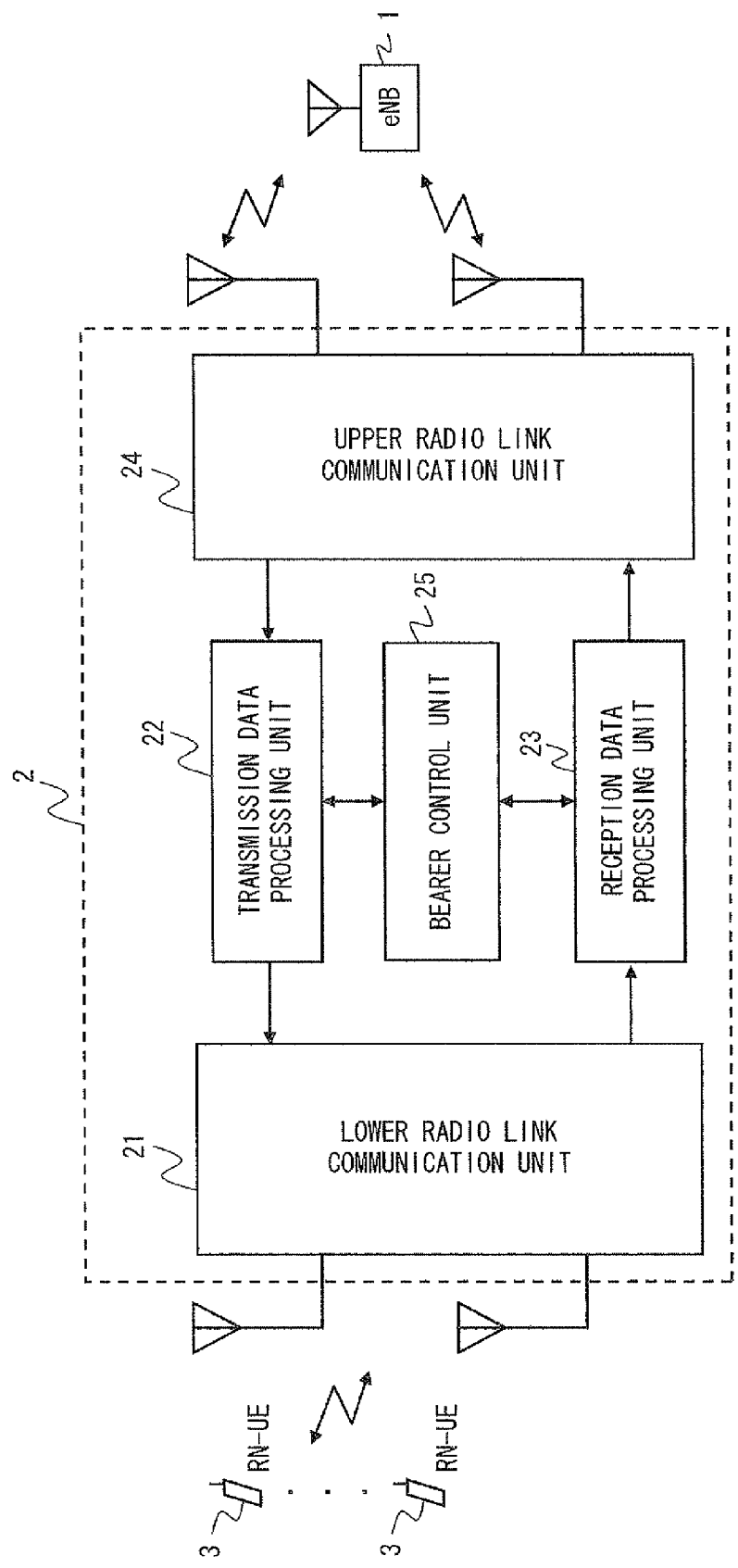
FIG. 5 is a block diagram showing an example configuration of a relay station according to the first embodiment of the present invention.

FIG. 5 is a block diagram showing an example configuration of the relay station 2 according to the first embodiment. The relay station 2 has functions similar to those of the base station 1 unless otherwise specified. Referring to FIG. 5, a lower radio link communication unit 21 receives an uplink signal transmitted from a mobile station through an antenna. A reception data processing unit 23 has functions similar to those of the reception data unit 13 of the base station 1, and transmits the obtained reception data to the base station 1 through an upper radio link communication unit 24.

A transmission data processing unit 22 has functions similar to those of the transmission data processing unit 12 of the base station 1, and generates a transmission symbol sequence from transmission data obtained from the upper radio link communication unit 24 and transmitted to the mobile station 3. The radio communication unit 21 generates a downlink signal from the symbol sequence and transmits it to the mobile station 3.

A bearer control unit 25 controls configuration information about a bearer which is received from the base station 1 or the core network 4 through the upper radio link communication unit 24 and the transmission data processing unit 22.

Figure 6:
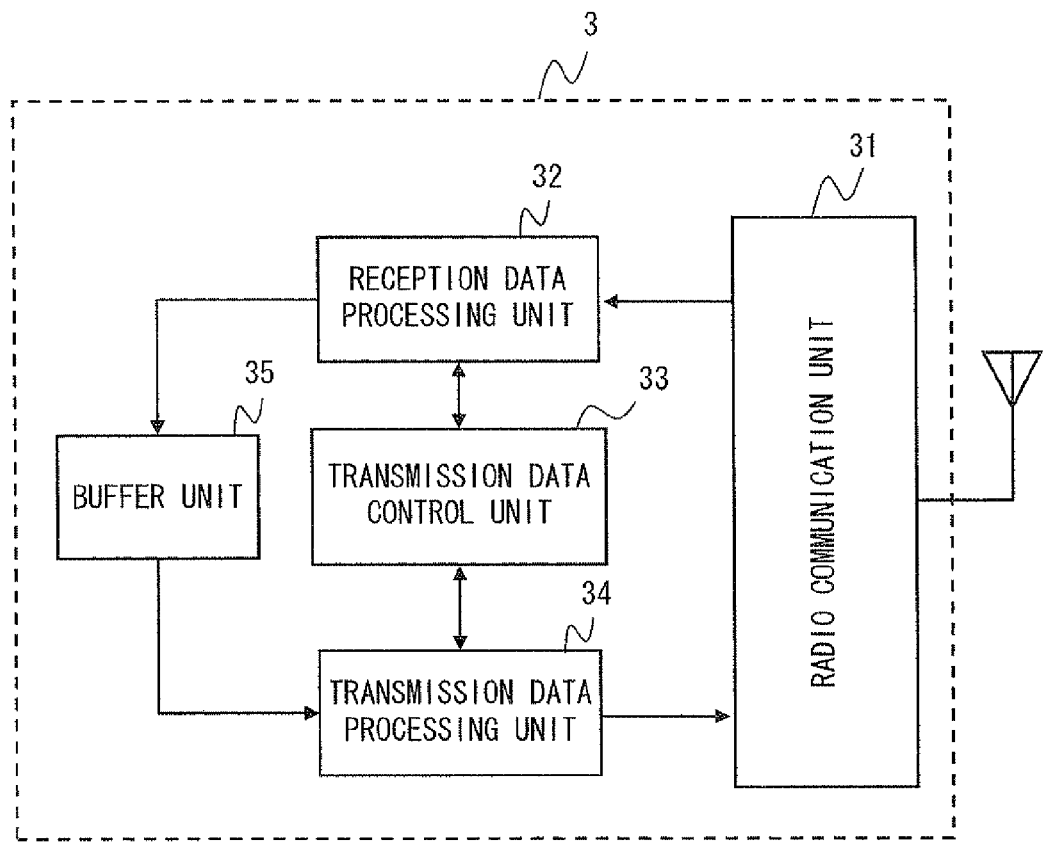
FIG. 6 is a block diagram showing an example configuration of a mobile station according to the first embodiment of the present invention.

FIG. 6 is a block diagram showing an example configuration of the mobile station 3 according to the first embodiment. A radio communication unit 31 receives a downlink signal through an antenna. A reception data processing unit 32 sends reception data restored from the received downlink signal to a buffer unit 35. The reception data stored in the buffer unit 35 is read out and used according to the purpose thereof. A transmission data control unit 33, a transmission data processing unit 34, and the radio communication unit 31 generate an uplink signal using the transmission data stored in the buffer unit 35 and transmit it to the base station 1 or the relay station 2.

Figure 7:
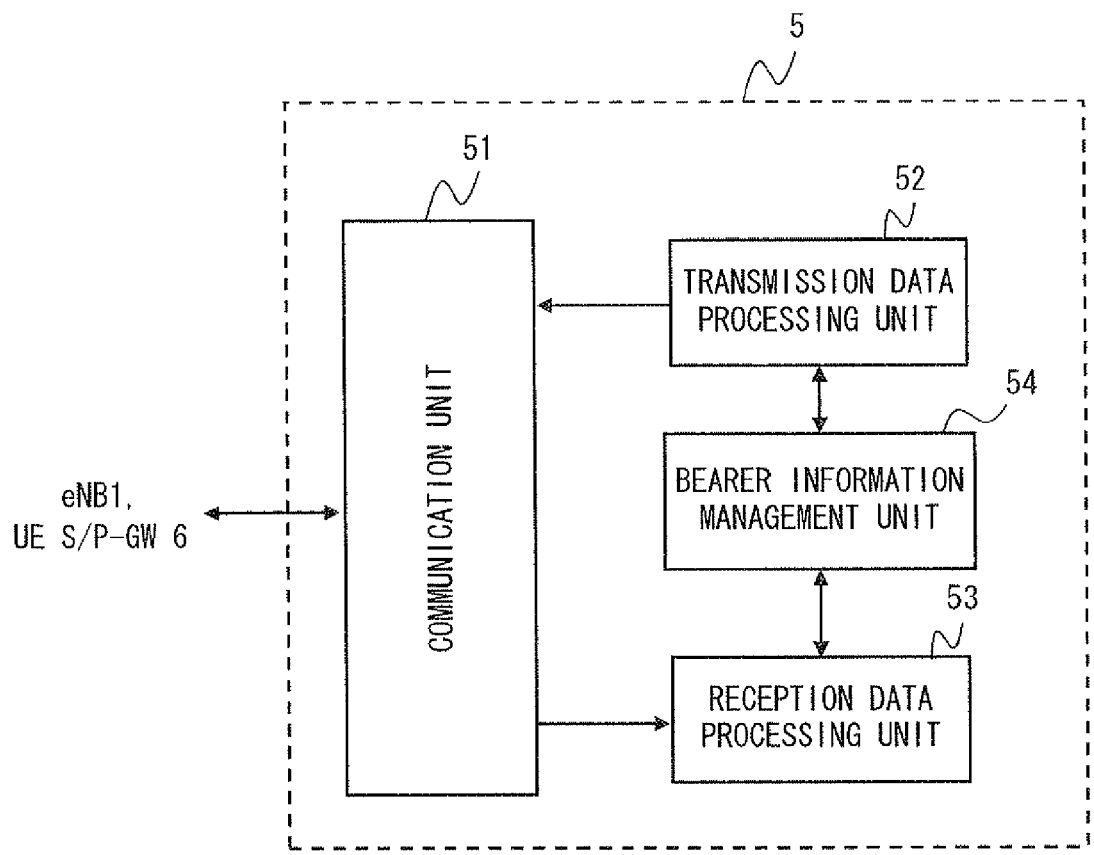
FIG. 7 is a block diagram showing an example configuration of a UE MME according to the first embodiment of the present invention.

FIG. 7 is a block diagram showing an example configuration of the UE MME 5 according to the first embodiment. The UE MME 5 includes a communication unit 51 for communicating with the base station 1 and the UE S/P-GW 6, a reception data control unit 53, and a bearer information management unit 54. The reception data processing unit 53 receives data from the base station 1 and the UE S/P-GW 6. When the reception data is a bearer creation request, the reception data control unit 53 transfers the bearer creation request to the bearer information management unit 54. When the bearer information management unit 54 receives the bearer creation request, it generates bearer configuration information and transmits it to the base station 1 and the UE S/P-GW 6 through the transmission data processing unit 52 and the communication unit 51. The RN MME 7 has a configuration similar to that of the UE MME 5 except that the communication destination is the RN S/P-GW 8 in place of the UE S/P-GW 6.

Figure 8:
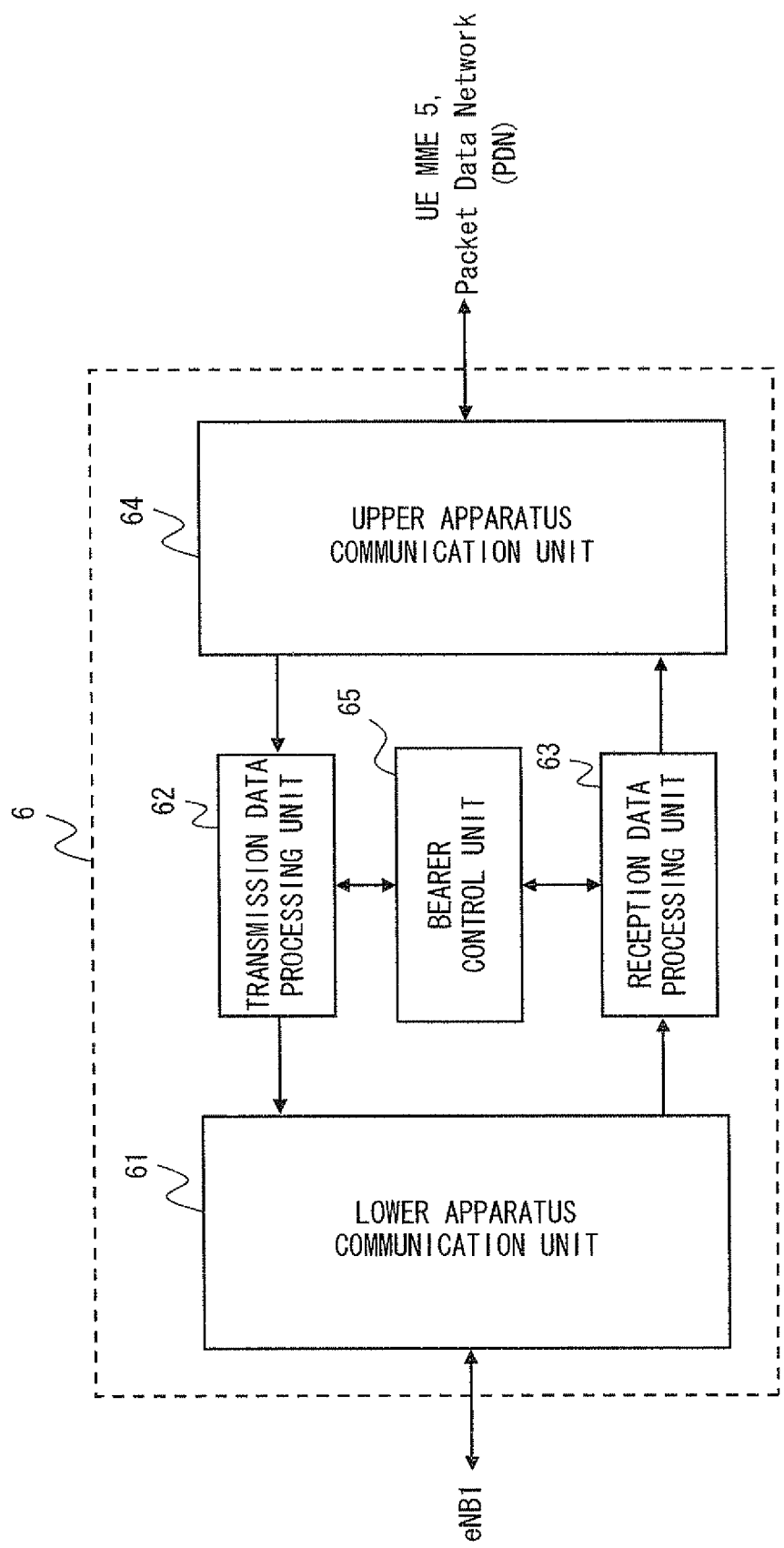
FIG. 8 is a block diagram showing an example configuration of a UE S/P-GW according to the first embodiment of the present invention.

FIG. 8 is a block diagram showing an example configuration of the UE S/P-GW 6 according to the first embodiment. The UE S/P-GW 6 includes a lower apparatus communication unit 61 for communicating with the base station 1, a transmission data processing unit 62, a reception data control unit 63, an upper apparatus communication unit 64 for communicating with the UE MME 5 and a packet data network (PDN), and a bearer control unit 65. The reception data processing unit 63 receives data transmitted from the base station 1. The bearer control unit 65 holds bearer configuration information received from the UE MME 5, and the transmission data processing unit 62 sets a bearer in accordance with the bearer configuration information.

The RN S/P-GW 8 has a configuration similar to that of the UE S/P-GW 6 except that the communication destination is the RN MME 7 in place of the UE MME 5. Since the RN S/P-GW 8 is placed in the base station 1, the communication unit 14 of the base station 1, the lower apparatus communication unit 61 for the RN S/P-GW 8 (for communication with another base station 1), and the upper apparatus communication unit 64 for the RN S/P-GW 8 may be implemented as a common interface in a physical implementation. When the RN S/P-GW 8 communicates with the base station 1 in which the RN S/P-GW 8 is placed, the lower apparatus communication unit 61 may be omitted, since it is an internal interface of the apparatus.

Figure 9:
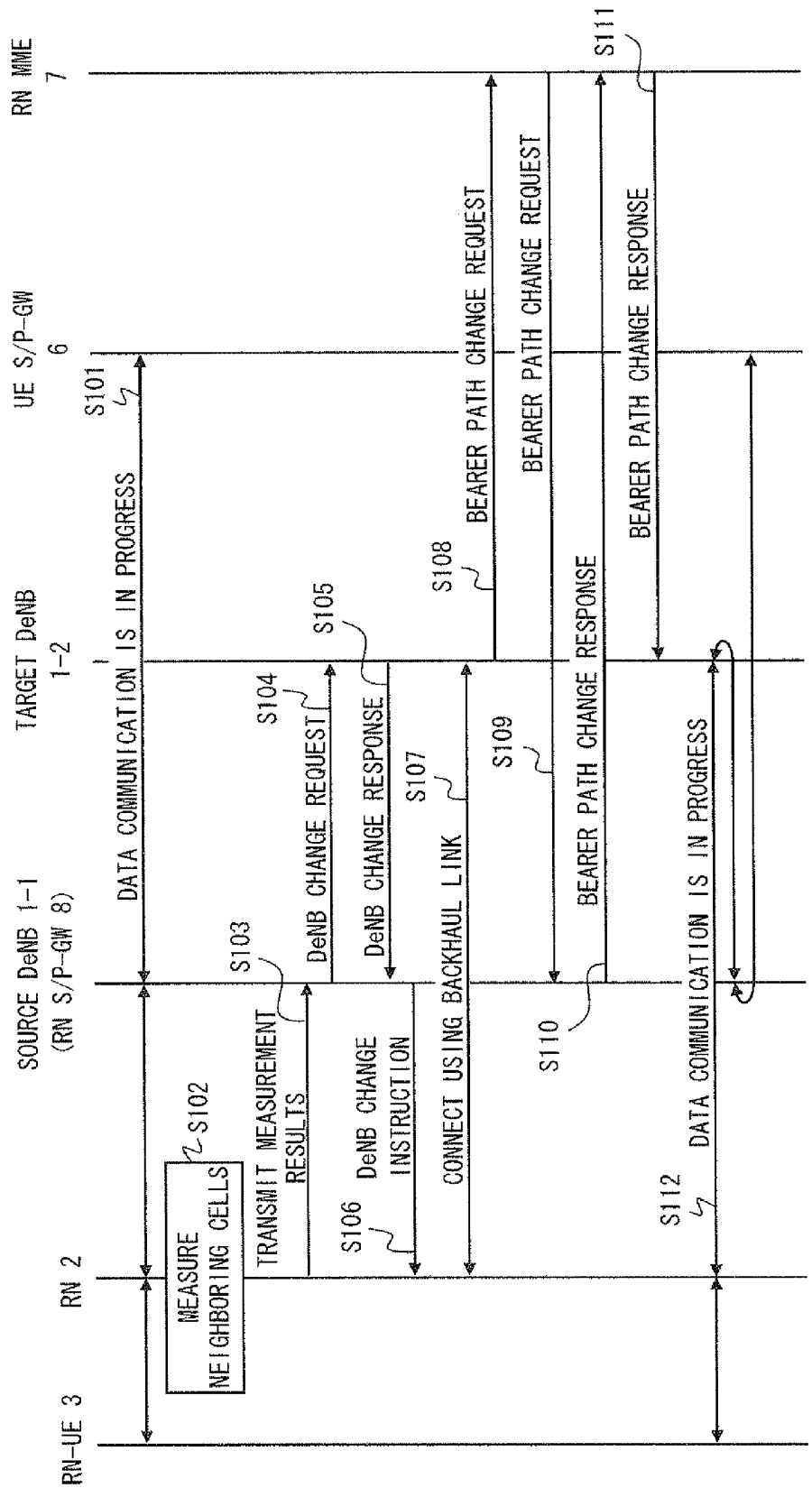
FIG. 9 is a sequence diagram showing an example of a procedure for changing a DeNB according to the first embodiment of the present invention.

Hereafter, referring to FIGS. 9 to 13, there will be described a specific example of a procedure for controlling the bearer for the RN when the relay station (RN) 2 changes the belonging destination from the base station (eNB) 1-1 to the base station (eNB) 1-2. FIG. 9 is a sequence diagram showing an example of a procedure for changing the path of the data bearer for the RN 2 when the RN 2 changes the DeNB to which it belongs. FIG. 9 shows interactions among the base station 1, the relay station 2, the mobile station 3, and the core network 4. In FIG. 9, "RN S/P-GW 8," "UE S/P-GW 6," and "RN MME 7" correspond to the core network 4; "source DeNB 1-1" to the base station 1-1; "target DeNB 1-2" to the base station 1-2; "RN 2" to the relay station 2; and "RN-UE 3" to the mobile station 3.

Step S101 shows that the RN-UE 3 and the UE S/P-GW 6 are performing data communication with each other through a data bearer set therebetween. For example, user data transmitted from the RN-UE 3 in an uplink direction passes through the RN-UE 3, the RN 2, the source DeNB 1-1, and the RN S/P-GW 8 in this order and finally reaches the UE S/P-GW 6. In step S102, the RN 2 measures radio states of neighboring cells in preparation for changing the DeNB to which it belongs. The RN 2 sends, to the source DeNB 1-1, neighboring cell measurement information including the measurement results (step S103). The source DeNB 1-1 receives the neighboring cell measurement information and sends a DeNB change request to the target DeNB 1-2 which is determined based on the measurement information (step S104).

When the target DeNB 1-2 accepts changing the DeNB, it replies a DeNB change response, including cell information of the target DeNB 1-2, to the source DeNB 1-1 (step S105). In order to notify the RN 2 of the received cell information of the target DeNB 1-2 and the like, the source DeNB 1-1 sends a DeNB change instruction to the RN 2 (step S106). The RN 2 then performs a backhaul link connection process with the target DeNB 1-2, which is indicated by the source DeNB 1-1, so as to change the DeNB to which it belongs (step S107). When the RN 2 belongs to the target DeNB 1-2, a data radio bearer (DRB) for the RN2 is set between the RN 2 and the target DeNB 1-2.

After the DeNB is changed, the target DeNB 1-2 sends a bearer path change request to the RN MME 7 (step S108). The RN MME 7 sends the bearer path change request to the source DeNB 1-2 in which the RN S/P-GW 8 is placed (step S109). The RN S/P-GW 8, which is placed in the source DeNB 1-1, changes a path of the data bearer for the RN 2 so as to pass through the source DeNB 1-1 and the target DeNB 1-2, and replies a bearer path change response to the RN MME 7 (step S110). The RN MME 7 sends the bearer path change response to the target DeNB 1-2 (step S111). As seen, the execution of steps S104 to S111 completes the process of updating the bearer configuration for the RN 2 accompanying the change of the belonging destination of the RN 2. After step S111, user data transmitted from the RN-UE 3 in an uplink direction, for example, passes through the RN-UE 3, the RN 2, the target DeNB 1-2, and the source DeNB 1-1 (RN S/P-GW 8) and finally reaches the UE S/P-GW 6 (step S112).

As described above, with respect to the control plane (i.e., S1 signaling connection) of the RN 2, the RN 2 is handled as a UE. That is, when the RN 2 belongs to the target DeNB 1-2, a signaling radio bearer (SRB) for the RN2 is set between the target DeNB 1-2 and the RN 2. This SRB is associated with a control protocol (S1 MME) established between the RN MME 7 and the target DeNB 1-2, in the target DeNB 1-2. The association between the SRB and the S1 MME may be called mapping or tunneling. Thus, control signals (i.e. non-access stratum (NAS) signals) exchanged between the RN 2 and the RN MME 7 for the session and mobility management of the RN 2 is transferred between the RN MME 7 and the target DeNB 1-2 without through the source DeNB 1-2.

Figure 10:
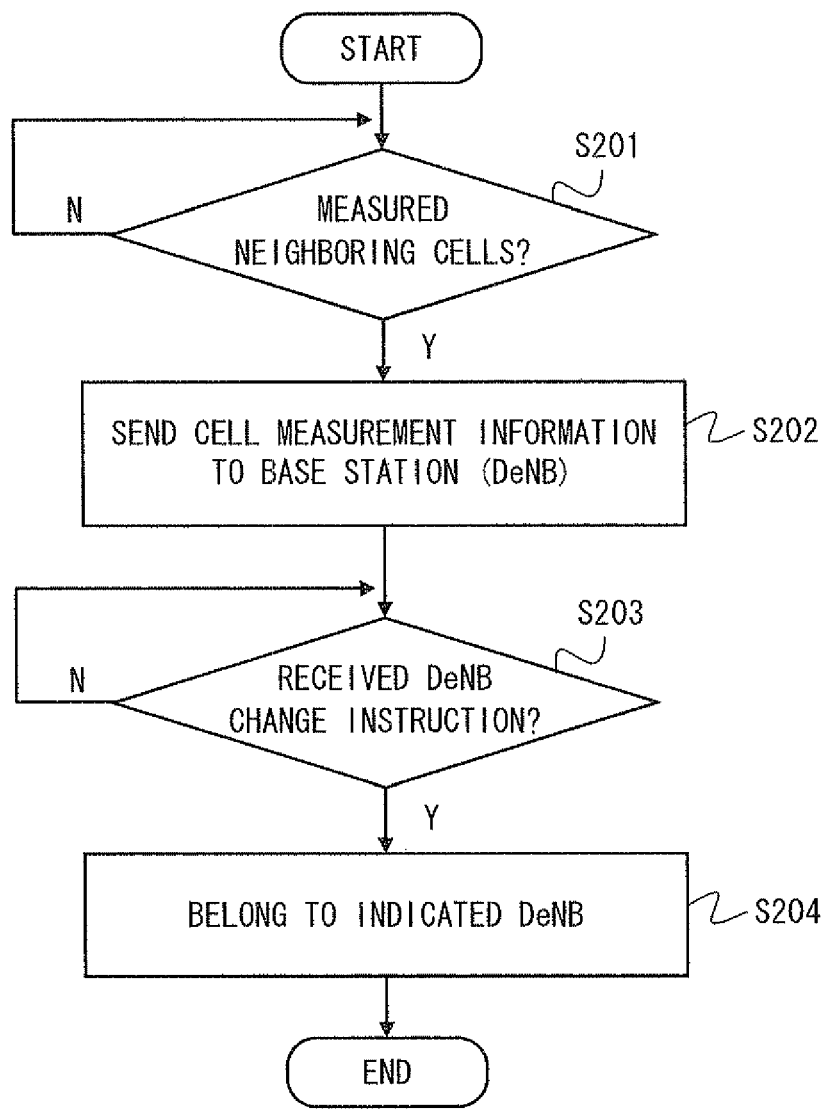
FIG. 10 is a flowchart showing an example operation of the relay station according to the first embodiment of the present invention.

FIG. 10 is a flowchart showing an example operation of the RN2 when the RN 2 changes the DeNB to which it belongs. The procedure of FIG. 10 starts when the RN 2 searches for neighboring cells to change the DeNB to which it belongs (step S201).

If the RN 2 has succeeded in measuring neighboring cells (YES in step S201), the RN 2 sends neighboring cell measurement information based on the measurement results to the source DeNB (step S202) and proceeds to step S203. If the RN 2 has not succeeded in measuring neighboring cells (NO in step S201), it returns to step S201. In step S203, the RN 2 determines whether the DeNB change instruction has been received from the source DeNB 1-1. If the RN 2 has received the DeNB change instruction (YES in step S203), it belongs to the target DeNB 1-2 in accordance with cell information of the target DeNB 1-2 and the like included in the DeNB change instruction (step S204) and ends the operation. If the RN 2 has not received the DeNB change instruction (NO in step S203), it returns to step S203 to again wait for the DeNB change instruction.

Figure 11:
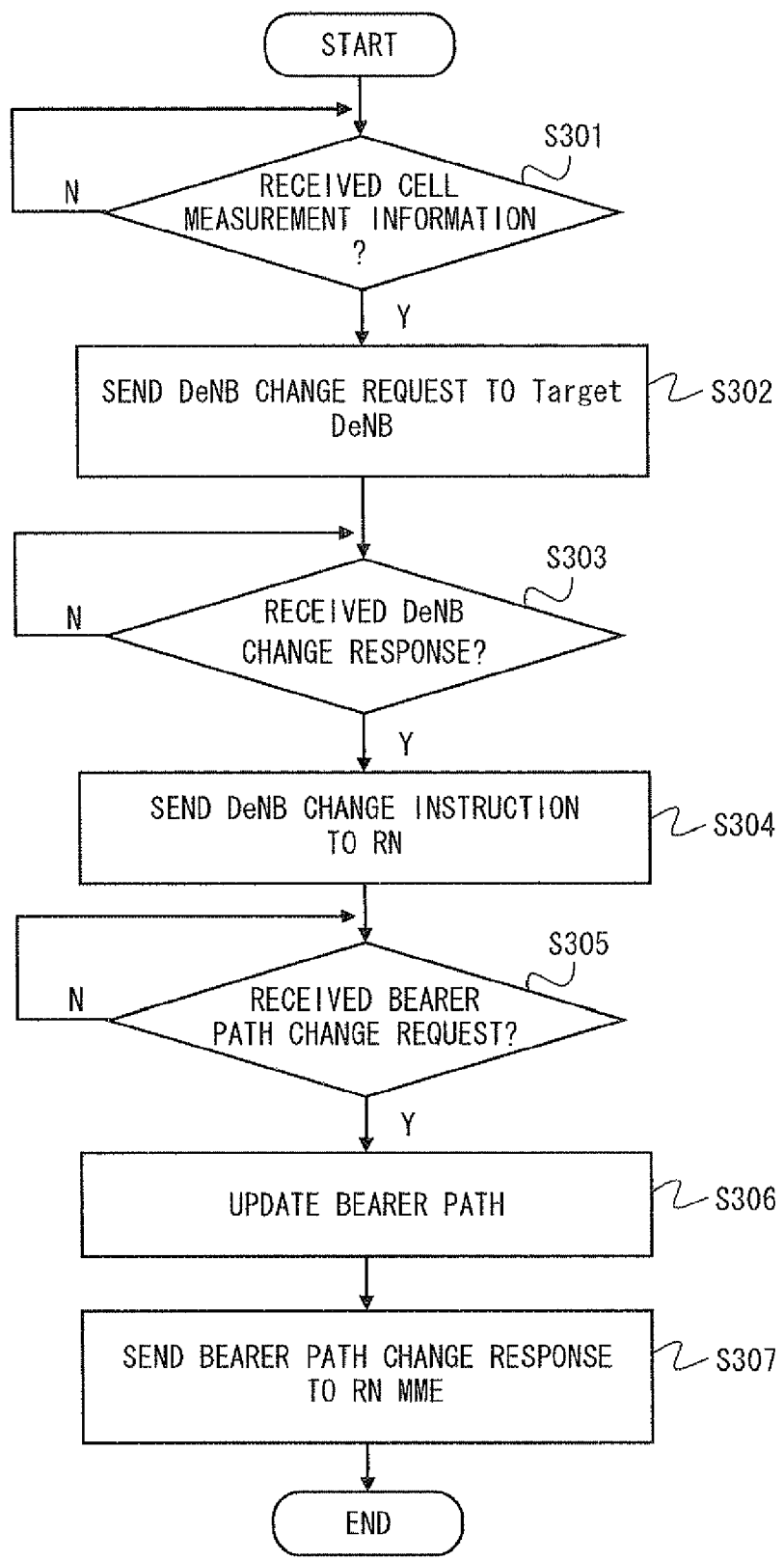
FIG. 11 is a flowchart showing an example operation of a source DeNB according to the first embodiment of the present invention.

FIG. 11 is a flowchart showing an example operation of the source DeNB 1-1 (including the RN S/P-GW 8) when the RN 2 changes the DeNB to which the RN2 belongs. In step S301, the source DeNB 1-1 determines whether the neighboring cell measurement information has been received from the RN 2. If the source DeNB 1-1 has received the neighboring cell measurement information (YES in step S301), the source DeNB 1-1 sends the DeNB change request to the target DeNB 1-2 which is determined based on the measurement information (step S302) and proceeds to step S303 to wait for a response. If the source DeNB 1-1 has not received the neighboring cell measurement information (NO in step S301), it returns to step S301 to again determine whether it has received the neighboring cell measurement information. If the source DeNB 1-1 has received the DeNB change response from the target DeNB 1-2 (YES in step S303), it sends the DeNB change instruction to the RN 2 (step S304) and ends the operation. If the source DeNB 1-1 has not received the DeNB change response (NO in step S303), it returns to step S303 to again wait for the DeNB change response.

If the source DeNB 1-1 has received the DeNB change response from the target DeNB 1-2 (YES in step S303), it sends the DeNB change instruction to the RN 2 (step S304) and proceeds to step S705 to determine whether the bearer path change request has been received from the RN MME 7. In step S305, the source DeNB 1-1 determines whether the bearer path change request has been received from the RN MME 7. If the source DeNB 1-1 has received the bearer path change request (YES in step S305), it (specifically, the RN S/P-GW 8 placed in the source DeNB 1-1) updates the path of the data bearer for the RN 2 in accordance with bearer path information included in the bearer path change request (step S306), then sends the bearer change response to the RN MME 7 (step S307), and ends the operation. If the source DeNB 1-1 has not received the bearer path change request (NO in step S305), it returns to step S305 to again wait for the bearer path change request. In the update of the path of the data bearer for the RN 2 in step S306, for example, the source DeNB 1-1 connects a second GTP tunnel for transferring packets about the RN 2 with the target DeNB 1-2, and also makes a configuration so as to relay the packets about the RN 2 between the second GTP tunnel and a first GTP tunnel that is already established between the source DeNB 1-1 and the RN S/P-GW 8. The second GTP tunnel may be connected using an inter-base station interface, such as X2 interface, or through the core network. Alternatively, in the update of the path of the data bearer for the RN 2 in step S306, the RN S/P-GW 8 placed in the source DeNB 1-1 may connect the second GTP tunnel for transferring packets about the RN 2 with the target DeNB 1-2, and then change a packet transfer path from the first GTP tunnel to the second GTP tunnel.

Figure 12:
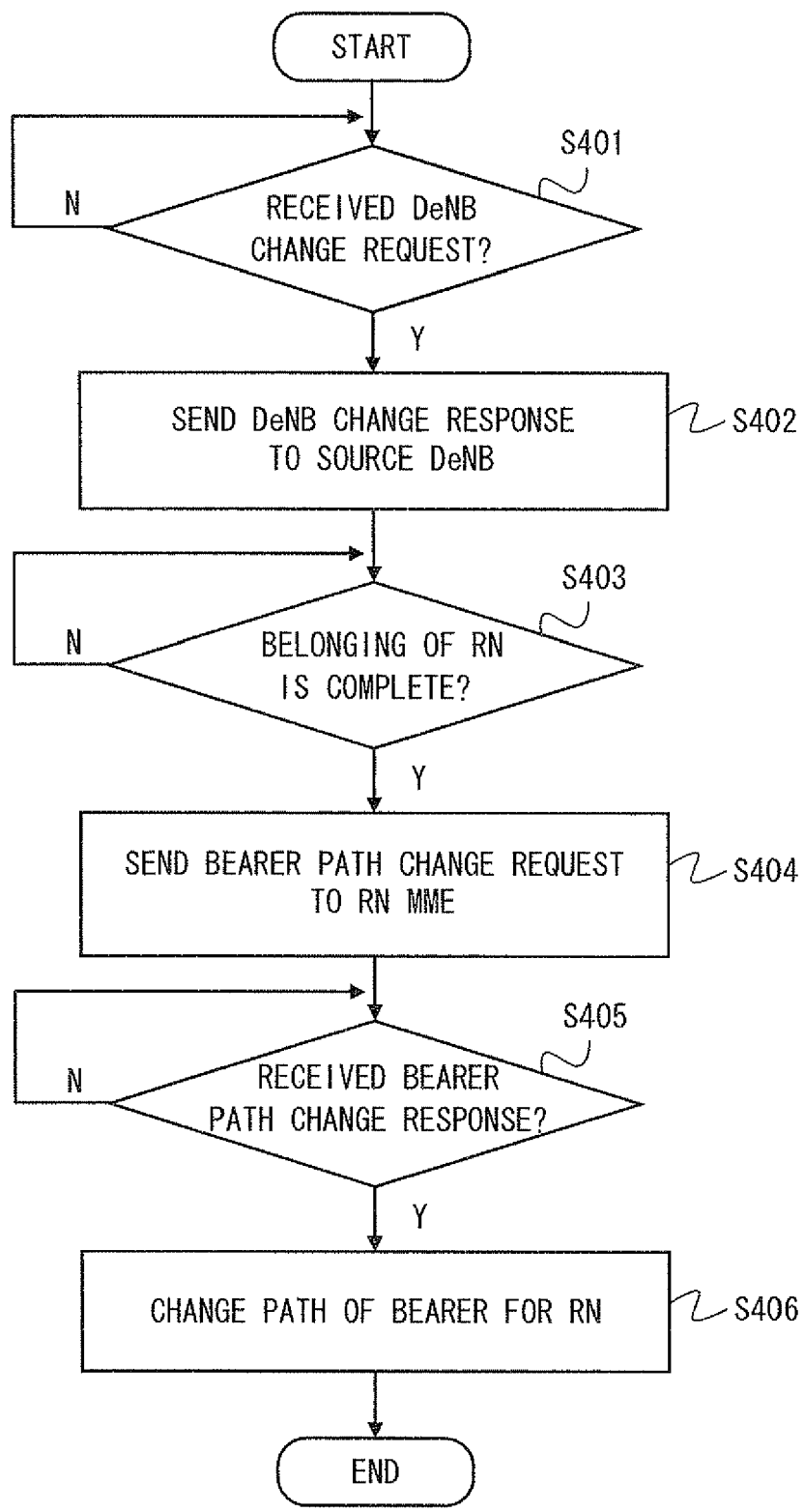
FIG. 12 is a flowchart showing an example operation of a target DeNB according to the first embodiment of the present invention.

FIG. 12 is a flowchart showing an example operation of the target DeNB 1-2 when the RN 2 changes the DeNB to which the RN2 belongs. In step S401, the target DeNB 1-2 determines whether the DeNB change request has been received from the source DeNB 1-1. If the target DeNB 1-2 has received the DeNB change request (YES in step S401), it determines whether or not to accept changing the belonging destination of the RN 2, then sends the DeNB change response to the source DeNB 1-1 (step S402), and proceeds to step S403 to wait for a belonging process from the RN 2. If the target DeNB 1-2 has not received the DeNB change request (NO in step S401), it returns to step S401 to again determine whether the DeNB change request has been received.

If the RN 2 has changed the belonging destination from the source DeNB 1-1 to the target DeNB 1-2 (YES in step S403), the target DeNB 1-2 sends the bearer path change request to the RN MME 7 (step S404) and proceeds to step S405 to wait for the bearer path change response from the RN MME 7. If the RN 2 has not changed the belonging destination from the source DeNB 1-1 to the target DeNB 1-2 (NO in step S403), the target DeNB 1-2 returns to step S403 to again wait for the RN 2 to change the belonging destination. If the target DeNB 1-2 has received the bearer path change response from the RN MME 7 (YES in step S405), it changes the path of the data bearer for the RN (step S406) and ends the operation. If the target DeNB 1-2 has not received the bearer path change response from the RN MME 7 (NO in step S405), it returns to step S405 to again wait for the bearer path change response from the RN MME 7. In the change of the path of the data bearer for the RN 2 in step S406, the source DeNB 1-1 makes a packet forwarding configuration such that the data bearer for the RN 2 passes through the target DeNB 1-2 and the source DeNB 1-1. Specifically, the target DeNB 1-2 connects the second GTP tunnel for transferring packets about the RN 2 with the source DeNB 1-1 (or the RN S/P-GW 8 placed in the source DeNB 1-1), and also makes a configuration so as to relay the packets about the RN 2 between the second GTP tunnel and the data radio bearer (DRB) that is already established between the RN 2 and the target DeNB 1-2.

Figure 13:
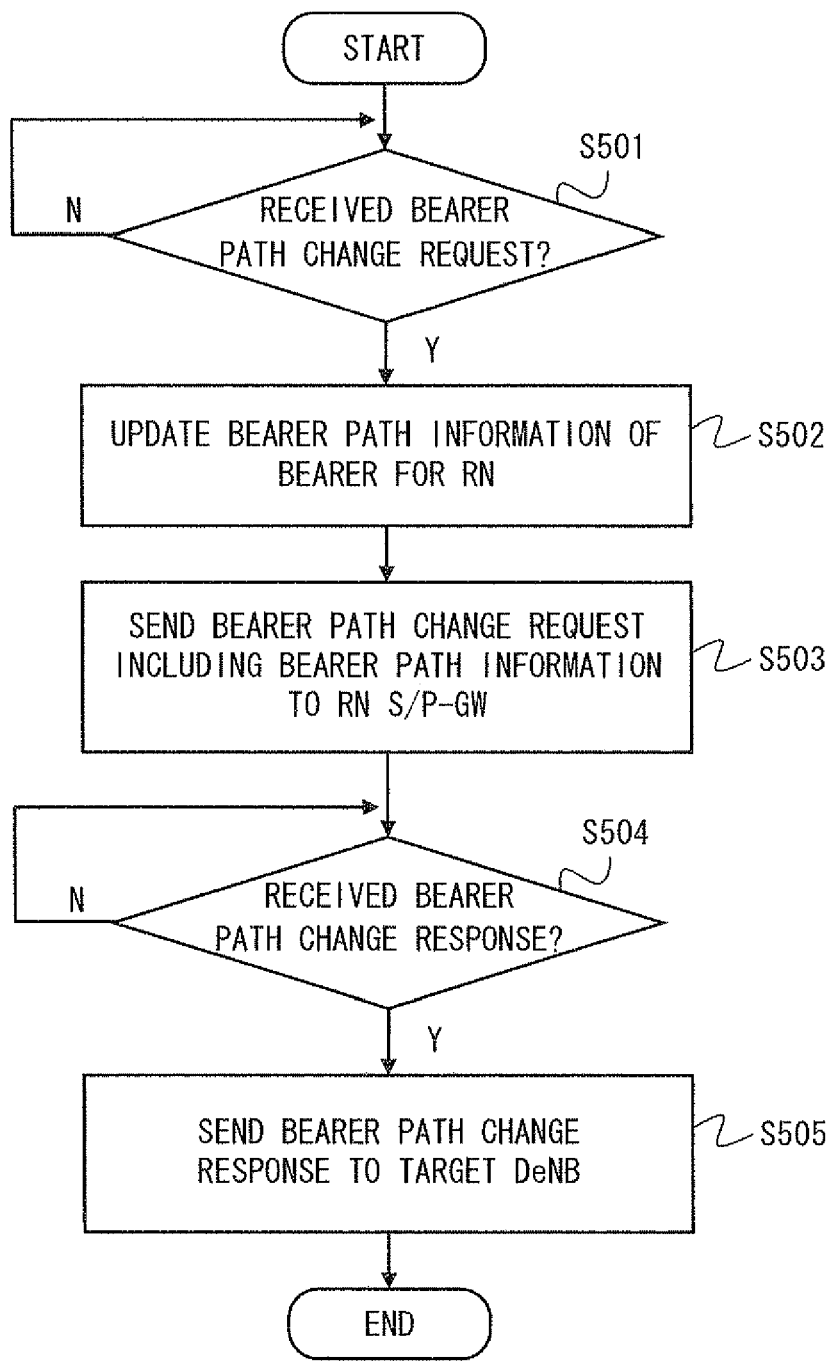
FIG. 13 is a flowchart showing an example operation of an RN MME according to the first embodiment of the present invention.

FIG. 13 is a flowchart showing an example of an operation for changing the path of the bearer for RN, performed by the RN MME 7, when the RN 2 changes the DeNB to which it belongs. In step S501, the RN MME 7 determines whether the bearer path change request has been received from the target DeNB 1-2. If the RN MME 7 has received the bearer path change request (YES in step S501), it updates the bearer path information (step S502), then sends the bearer path change request including the bearer path information to the RN S/P-GW 8 (step S503), and proceeds to step S504 to wait for the bearer path change response from the RN S/P-GW 8. If the RN MME 7 has received the bearer path change response from the RN S/P-GW 8 (YES in step S504), it sends the bearer change response to the target DeNB 1-2 (step S505) and ends the operation. If the RN MME 7 has not received the bearer path change response (NO in step S504), it returns to step S504 to again wait for the bearer path change response.

The operation of the mobile station 3 does not differ from a typical operation, so the description thereof is omitted.

Introduction of an RN requires an RN S/P GW that terminates the data bearer for the RN. In the present embodiment, as described above, the RN S/P-GW 8 placed in the source base station (DeNB 1-1) operates as a mobility anchor point. According to the configuration and operation described above, even when the relay station (RN) 2 moves between the base stations (DeNB) 1, there is no need to change the RN S/P-GW 8 terminating the data bearer for the RN 2. Accordingly, it is possible to change the DeNB while keeping communication of the RN-UE 3, without releasing the data bearer for the RN 2 and the signaling bearer and data bearer for the RN-UE 3.

In the present embodiment, there has been described the example in which the RN S/P-GW 8 placed in the base station (DeNB) 1 serves as a mobility anchor point. However, the idea that the RN S/P-GW 8 serves as a mobility anchor point is also applicable to a case in which the RN S/P-GW 8 is placed in the core network 4, as described in a second embodiment below. Specifically, this concept is applicable to a case in which two RN S/P-GWs 8 are placed in the core network 4 and in which the source base station (DeNB) 1-1 and the target base station (DeNB) 1-2 are connected to the different RN S/P-GWs 8. In this case, it is only necessary to, after the RN 2 belongs to the target base station (DeNB), use the RN S/P-GW 8, to which the source base station (DeNB) 1-1 is connected, as a mobility anchor point.

Second Embodiment

Figure 14:
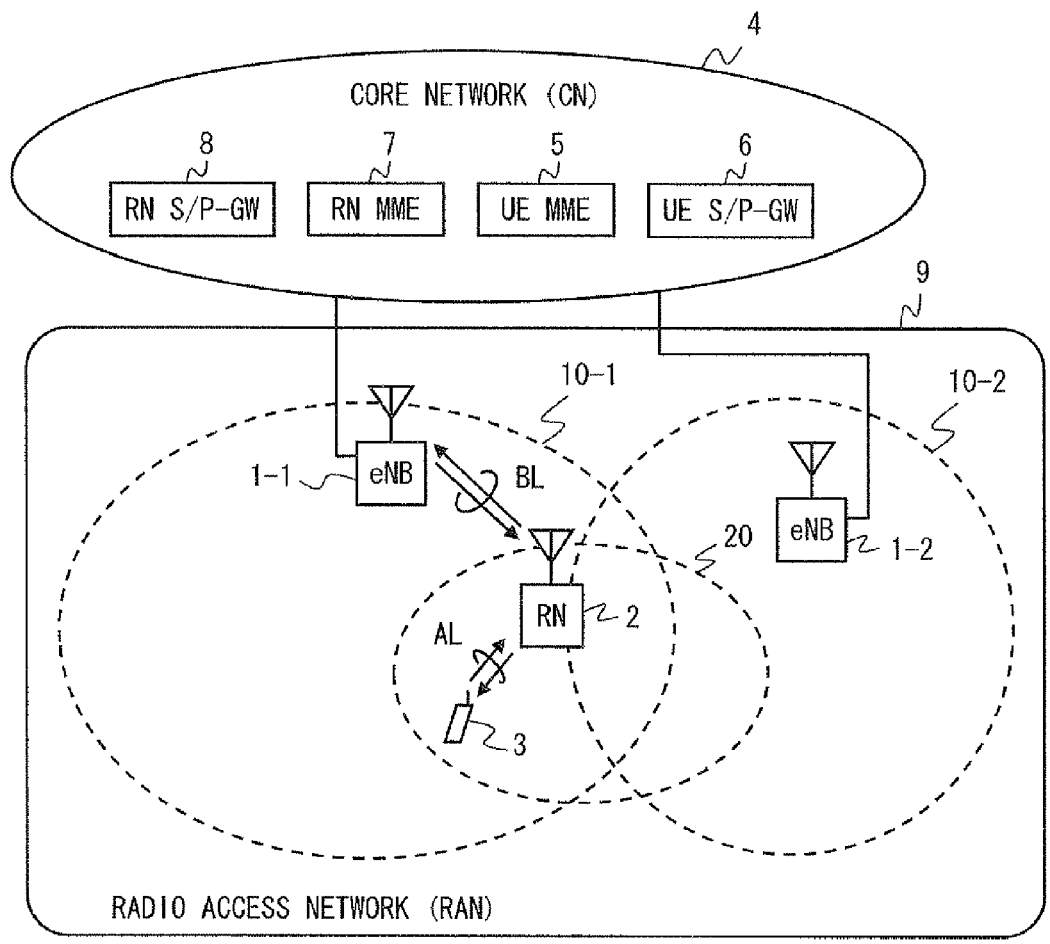
FIG. 14 is a block diagram showing an example configuration of a mobile communication system according to a second embodiment of the present invention.

FIG. 14 is a block diagram showing an example configuration of a mobile communication system according to the present embodiment. In the present embodiment, the functions of the RN S/P-GW 8 described in the background art are placed in the core network 4 rather than in the base station (DeNB) 1. Specifically, the relay station (RN) 2 can move between the base stations (DeNB) 1 through a DeNB change process which uses an inter-base station control interface (i.e., X2 interface) between the source base station (DeNB 1-1) and the target base station (DeNB 1-2) and a path (bearer path) change process which uses an interface (i.e., S1 interface) between the target base station (DeNB 1-2) and the RN MME 7. According to the configuration and operation described above, even when the relay station (RN) 2 moves between the base stations (DeNB) 1, there is no need to change the RN S/P-GW 8 terminating the data bearer for the RN 2. As a result, it is possible to change the DeNB while keeping communication of RN-UE 3, without releasing the data bearer for the RN 2 and the signaling bearer and data bearer for the RN-UE 3.

Figure 15:
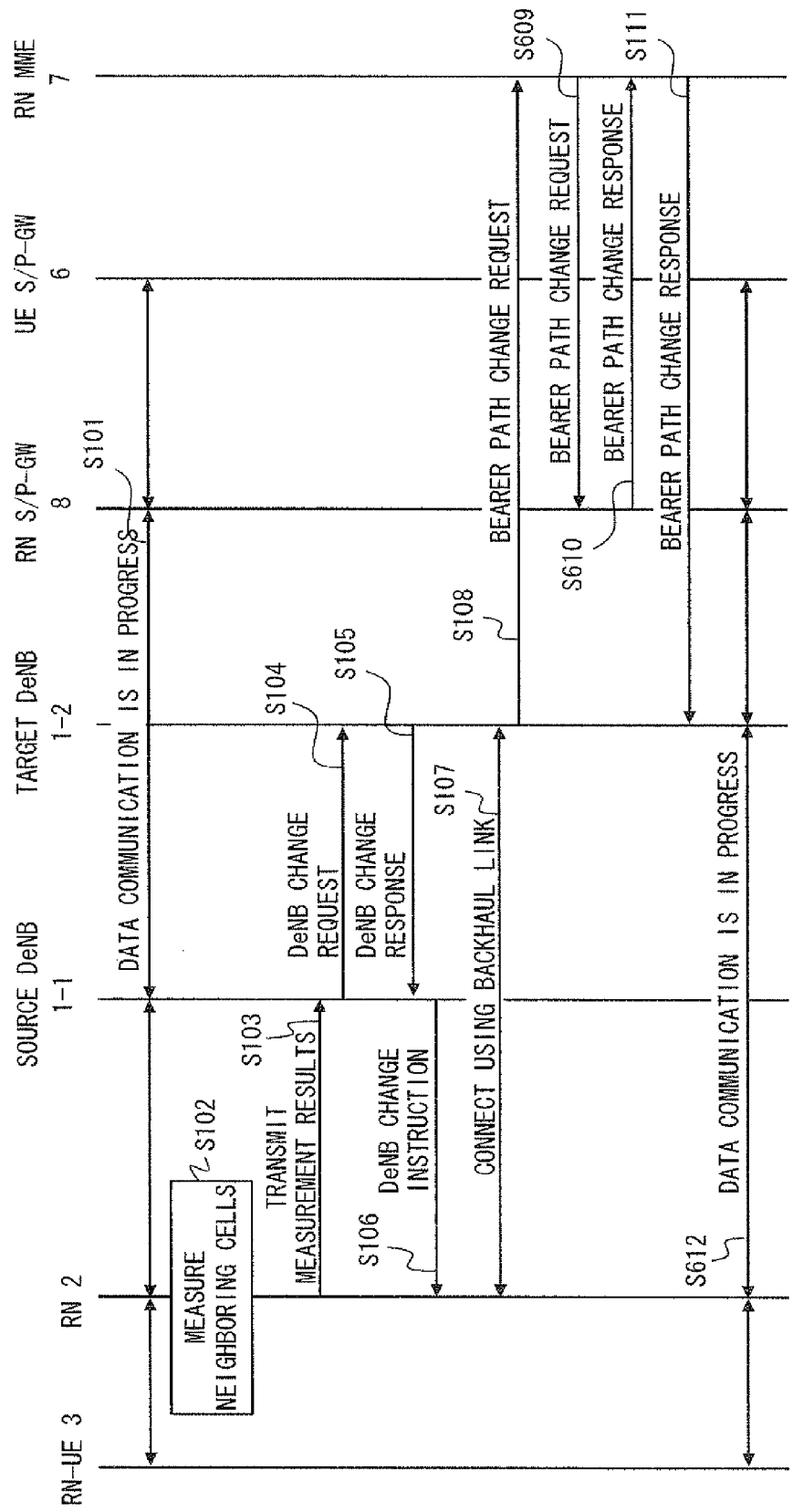
FIG. 15 is a sequence diagram showing an example of a procedure for changing a DeNB according to the second embodiment of the present invention.

Hereafter, the configuration and operation of the mobile communication system according to the present embodiment will be described in detail. FIG. 15 is a sequence diagram showing an example of a procedure for changing the DeNB to which the RN 2 belongs according to the second embodiment. Steps S101 to S108 are similar to those in FIG. 9 described in the first embodiment and therefore only the differences will be described.

In step S108 after the RN 2 completes changing the DeNB to which the RN 2 belongs, the target DeNB 1-2 sends the bearer path change request to the RN MME 7. The RN MME 7 sends the bearer path change request (including an IP address of the target DeNB 1-2 and a tunnel endpoint identifier (TEID)) to the RN S/P-GW 8 (step S609). The RN S/P-GW 8 performs a process of changing the path of the data bearer for the RN 2 so as to pass through the target DeNB 1-2 rather than through the source DeNB 1-1, and then replies the bearer path change response to the RN MME 7 (step S610). The RN MME 7 sends the bearer path change response to the target DeNB 1-2 (step S111). The execution of steps S104 to S111 of FIG. 15 completes the process of updating the configuration of the path of the data bearer for the RN 2 accompanying the change of the belonging destination of the RN 2. After step S111, user data transmitted from the RN-UE 3 in an uplink direction, for example, passes through the RN-UE 3, the RN 2, the target DeNB 1-2, and the RN S/P-GW 8 and finally reaches the UE S/P-GW 6 (step S612).

As described above, with respect to the control plane (i.e., S1 signaling connection) of the RN 2, the RN 2 is handled as a UE. That is, when the RN 2 belongs to the target DeNB 1-2, a signaling radio bearer (SRB) for the RN2 is set between the target DeNB 1-2 and the RN 2. This SRB is associated with a control protocol (S1 MME) established between the RN MME 7 and target DeNB 1-2, in the target DeNB 1-2. The association between the SRB and the S1 MME may be called mapping or tunneling. Thus, control signals (i.e., non-access stratum (NAS) signals) exchanged between the RN 2 and the RN MME 7 for the session and mobility management of the RN 2 is transferred between the RN MME 7 and the target DeNB 1-2 without through the source DeNB 1-2. If the RN 2 cannot transmit user data directly to the target DeNB 1-2 due to the setting of the apparatus, the RN 2 may transmit the user data to the target DeNB 1-2 through the source DeNB 1-2.

Figure 16:
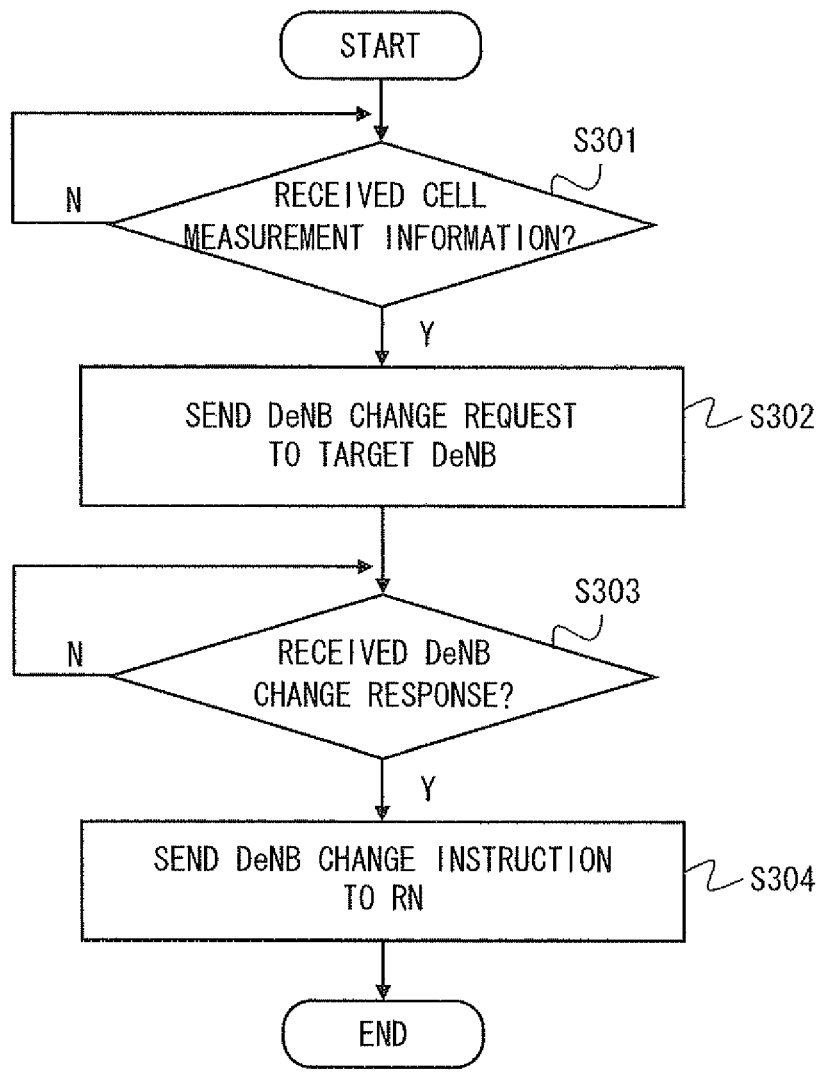
FIG. 16 is a flowchart showing an example operation of a source DeNB according to the second embodiment of the present invention.

FIG. 16 is a flowchart showing an example operation of the source DeNB 1-1 when the RN-UE 3 changes the DeNB to which it belongs according to the second embodiment. Steps S301 to step S304 of FIG. 16 are the same as those in FIG. 11 described in the first embodiment, so the detailed description thereof is omitted.

Figure 17:
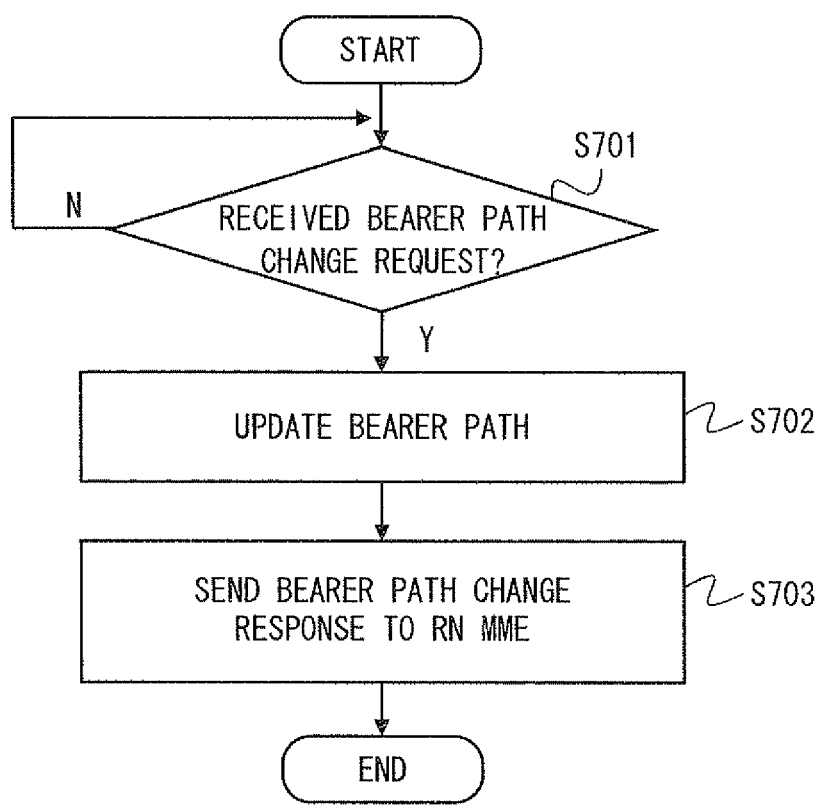
FIG. 17 is a flowchart showing an example operation of an RN S/P-GW according to the second embodiment of the present invention.

FIG. 17 is a flowchart showing an example of an operation for changing the path of the RN bearer, performed by the RN S/P-GW 8, when the RN 2 changes the DeNB to which it belongs. In step S701, the RN S/P-GW 8 determines whether the bearer path change request has been received from the RN MME 7. If the RN S/P-GW 8 has received the bearer path change request (YES in step S701), it updates the path of the data bearer for the RN 2 in accordance with the bearer path information included in the bearer path change request (step S702), then sends the bearer change response to the RN MME 7 (step S703), and ends the operation. If the RN S/P-GW 8 has not received a bearer path change request (NO in step S701), it returns to step S701 to again wait for the bearer path change request. In the update of the path of the data bearer for the RN 2 in step S702, the RN S/P-GW 8 may connects the second GTP tunnel for transferring packets about the RN 2 with the target DeNB 1-2, and then change the packet transfer path from the first GTP tunnel, which is already established between the RN S/P-GW 8 and the source DeNB 1-1, to the second GTP tunnel.

The operations of the RN 2, the target DeNB 1-2, and the RN MME 7 according to the present embodiment are similar to those in FIGS. 10, 12, and 13 described in the first embodiment, so the detailed description thereof is omitted. Note that in the change of the path of the data bearer for RN (in step S406 of FIG. 12), the target DeNB 1-2 may connects a GTP tunnel for transferring packets about the RN 2 with the RN S/P-GW 8, and also make a configuration so as to relay the packets about the RN 2 between the GTP tunnel and the data radio bearer (DRB) that is already established between the RN 2 and the target DeNB 1-2.

The operation of the mobile station 3 does not differ from a typical operation, so the detailed description thereof is omitted.

In the present embodiment, as described above, the functions of the RN S/P-GW 8 are placed in the core network 4 rather than in the base station (eNB) 1. Thus, when the RN 2 changes the DeNB to which it belongs, the RN S/P-GW 8 terminating the bearer for the RN 2 is not changed. As a result, it is possible to change the DeNB while keeping communication of the RN-UE 3, without releasing the data bearer for the RN 2 and the signaling bearer and data bearer for the RN-UE 3.

Third Embodiment

The present embodiment shows an example in which, after the RN 2 changes the DeNB to which it belongs according to the method described in the first embodiment, the RN S/P-GW 8 is changed in response to a predetermined condition being satisfied. Specifically, the present embodiment shows an example in which the RN S/P-GW 8 is changed in response to determining by the target DeNB 1-2 that the predetermined condition is satisfied. An example configuration of a mobile communication system according to the present embodiment is similar to that in FIG. 3 described in the first embodiment.

Figure 18:
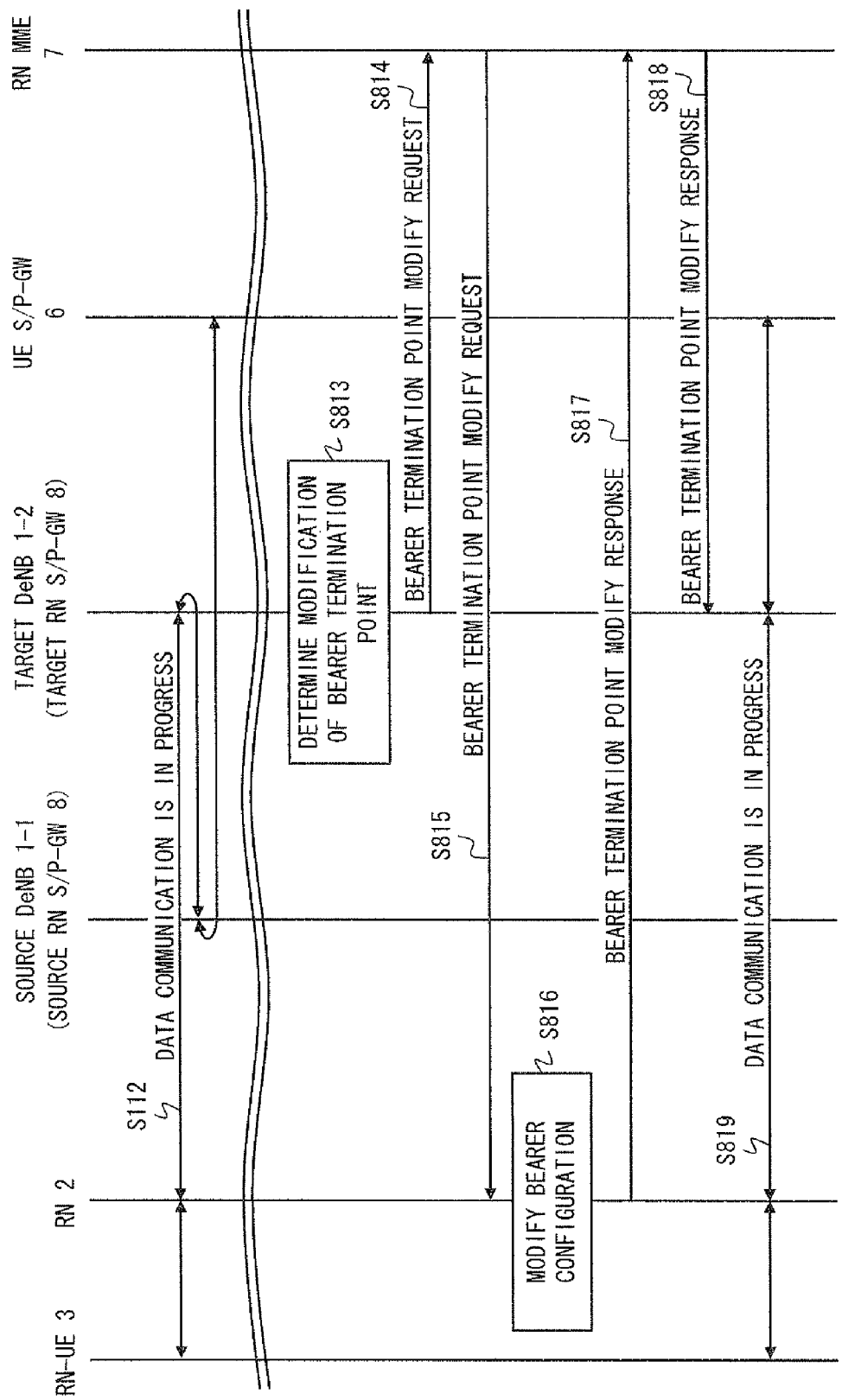
FIG. 18 is a sequence diagram showing an example of a procedure for changing a DeNB according to a third embodiment of the present invention.

FIG. 18 is a sequence diagram showing an example of a procedure for changing an RN S/P-GW according to the third embodiment. The sequence diagram of FIG. 18 is formed by additionally providing steps S813 to S819 for changing the RN S/P-GW 8 after step S112 of the sequence diagram shown in FIG. 4 related to the first embodiment.

In step S813, the target DeNB 1-2 decides to change the RN S/P-GW 8 terminating the bearer for the RN 2. Specifically, the data delay time increases with an increase in the number of DeNBs through which the bearer for the RN 2 passes. For this reason, when the data delay time increases to exceed an allowable level, it is preferred to reconfigure the path of the bearer for the RN 2. Accordingly, for example, when the number of DeNBs through which the bearer for the RN 2 passes becomes greater than or equal to a predetermined value, the target DeNB 1-2 decides to change the RN S/P-GW 8 terminating the bearer for the RN 2. The target DeNB 1-2 transmits a bearer termination point modify request to the RN MME 7 (step S814). The RN MME 7 sends, to the RN 2, the bearer termination point modify request including configuration information of the bearer for the RN 2 (step S815). The configuration information of the bearer for the RN 2, included in the bearer termination point modify request, includes an IP address of the RN S/P-GW 8 placed in the target DeNB 1-2 and an endpoint identifier (TEID) in order to change the termination point of the bearer for the RN 2 to the RN S/P-GW 8 placed in the target DeNB 1-2.

The RN 2 modifies the bearer configuration for the RN 2 in accordance with the bearer configuration information received from the RN MME 7 (step S816), and sends the bearer termination point modify response to the RN MME 7 (step S817). The RN MME 7 sends the bearer termination point modify response to the target DeNB 1-2 (step S818). After step S818 in which the RN S/P-GW 8 terminating the bearer for the RN 2 is changed, user data transmitted from the RN-UE 3 in an uplink direction, for example, passes through the RN-UE 3, the RN 2, and the target DeNB 1-2, and finally reaches the UE S/P-GW 6, without through the source DeNB 1-1 (step S819).

Figure 19:
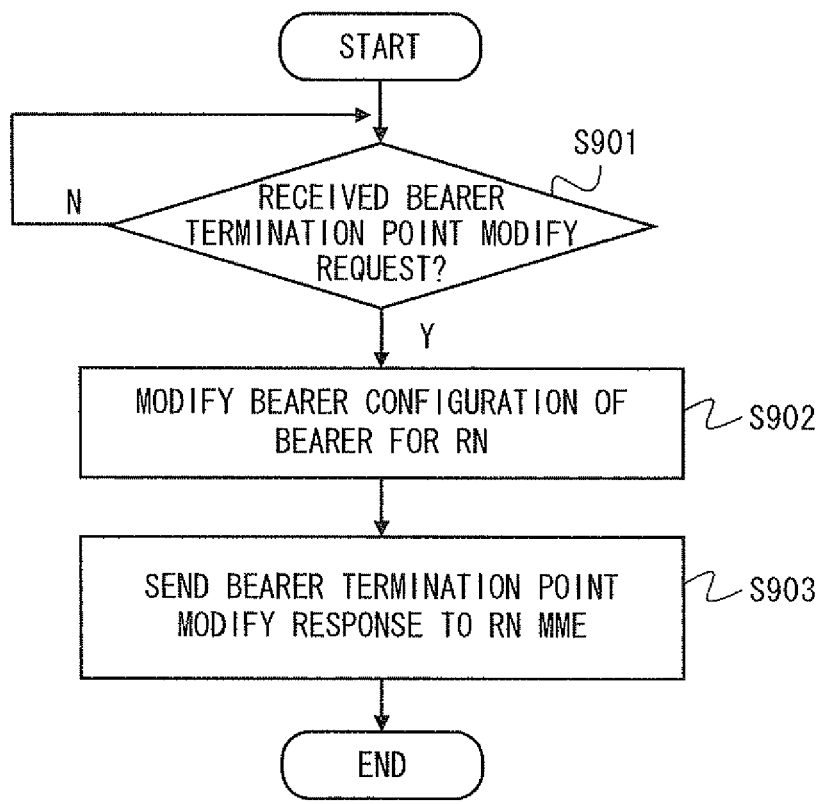
FIG. 19 is a flowchart showing an example operation of a relay station according to the third embodiment of the present invention.

FIG. 19 is a flowchart showing an example operation of the RN2 when the RN S/P-GW 8 terminating the bearer for the RN 2 is changed. The procedure starts when the RN 2 receives the bearer termination point modify request from the RN MME 7 (step S901). If the RN 2 has received the bearer termination point modify request (YES in step S901), it updates the configuration of the bearer for the RN 2 (context of an EPS bearer) in accordance with the bearer configuration information included in the bearer termination point modify request (step S902). The RN 2 sends the bearer termination point modify response to the RN MME 7 (step S903) and ends the operation. If the RN 2 has not received the bearer termination point modify request (NO in step S901), it returns to step S901.

Figure 20:
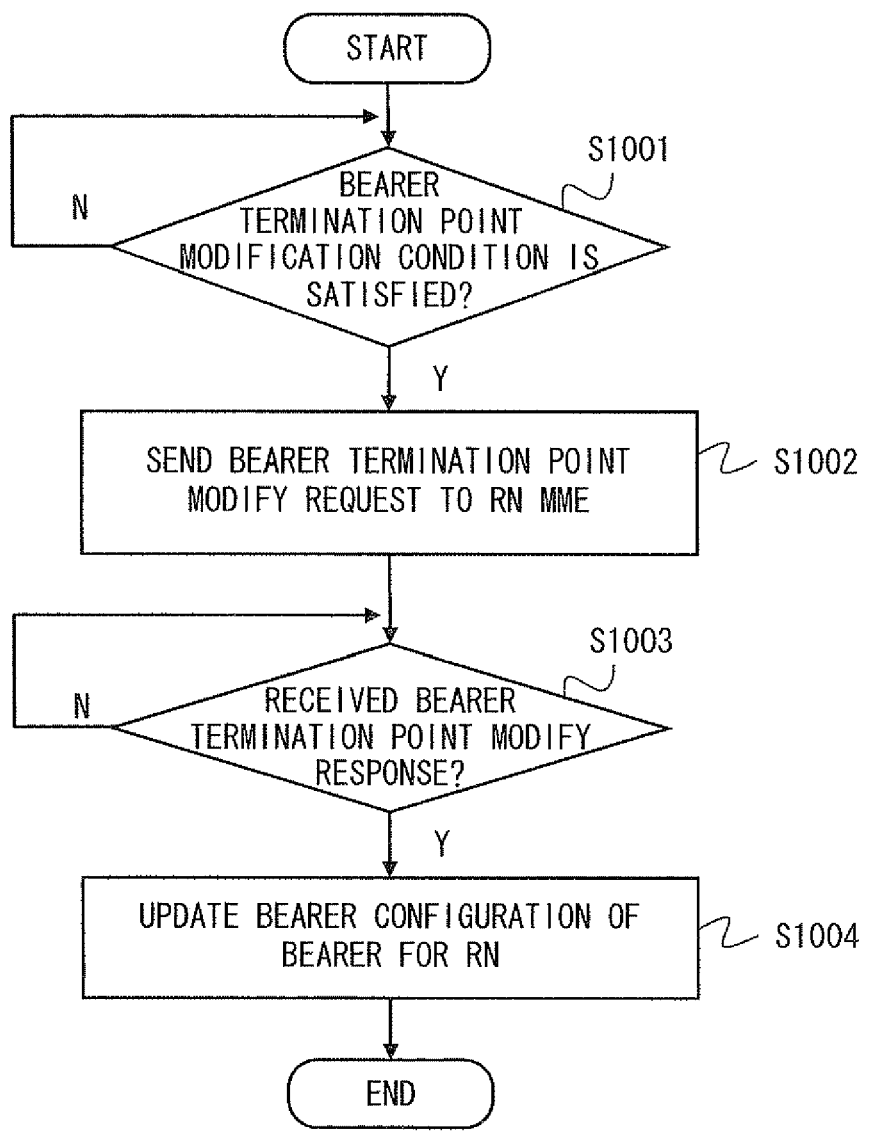
FIG. 20 is a flowchart showing an example operation of a target DeNB according to the third embodiment of the present invention.

FIG. 20 is a flowchart showing an example operation of the target DeNB 1-2 when the RN S/P-GW 8 terminating the bearer for the RN 2 is changed. In step S1001, the target DeNB 1-2 determines whether a condition for changing the RN S/P-GW 8 terminating the bearer for the RN 2 is satisfied. If the condition for changing the RN S/P-GW 8 is satisfied, for example, if the number of DeNBs through which the bearer for the RN 2 passes is greater than or equal to a predetermined value (YES in step S1001), the target DeNB 1-2 sends the bearer termination point modify request to the RN MME 7 (step S1002) and proceeds to step S1003 to wait for the response from the RN MME 7. If the condition for changing the RN S/P-GW 8 is not satisfied (NO in step S1001), the target DeNB 1-2 returns to step S1001 to determine whether the condition for changing the RN S/P-GW 8 is satisfied. If the target DeNB 1-2 receives the bearer termination point modify response from the RN MME 7 in step S1003 (YES in step S1003), it updates the configuration of the bearer for the RN 2 (context of an EPS bearer) (step S1004) and ends the operation. If the target DeNB 1-2 has not received the bearer termination point modify response from the RN MME 7 (NO in step S1003), it returns to step S1003 to wait for the bearer termination point modify response from the RN MME 7.

Figure 21:
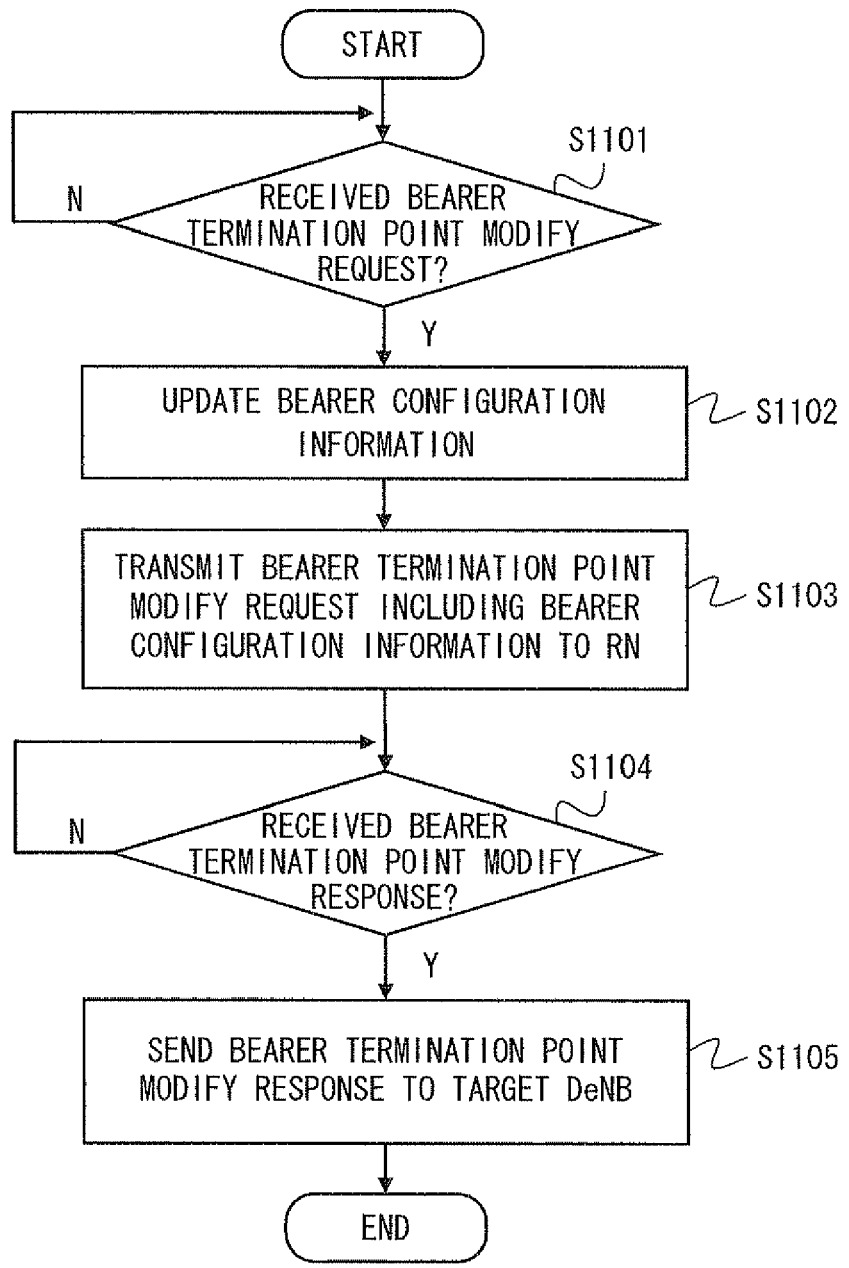
FIG. 21 is a flowchart showing an example operation of an RN MME according to the third embodiment of the present invention.

FIG. 21 is a flowchart showing an example operation of the RN MME 7 when he RN S/P-GW 8 terminating the bearer for the RN 2 is changed. In step S1101, the RN MME 7 determines whether the bearer termination point modify request has been received from the target DeNB 1-2. If the RN MME 7 has received the bearer termination point modify request (YES in step S1101), it updates the bearer configuration of the bearer for the RN 2 (step S1102), then sends to the RN 2 a bearer termination point modify request including the updated bearer configuration information about the bearer for the RN 2 (step S1103), and proceeds to step S1104 to wait for the bearer termination point modify response from the RN 2. If the RN MME 7 has received the bearer termination point modify response from the RN 2 (YES in step S1104), it sends the bearer termination point modify response to the target DeNB 1-2 (step S1105) and ends the operation. If the RN MME 7 has not received the bearer termination point modify response (NO in step S1104), it returns to step S1104 to again wait for the bearer termination point modify response.

The operation of the source DeNB 1-1 according to the present embodiment is similar to that according to the first embodiment, so the detailed description thereof is omitted. The operation of the mobile station 3 does not differ from a typical operation, so the detailed description thereof is omitted.

The predetermined condition for changing the RN S/P-GW 8 may be based on the radio quality of the backhaul link of the RN 2, the number of RN-UEs 3 connected to the RN 2, or the moving speed of the RN 2.

In the present embodiment, as in the first and second embodiments, even when the relay station (RN) 2 moves between the base stations (DeNB) 1, there is no need to change the RN S/P-GW 8 terminating the data bearer for the RN 2. As a result, it is possible to change the DeNB while keeping communication of the RN-UE 3, without releasing the data bearer for the RN 2 and the signaling bearer and data bearer for RN-UE 3. Further, in the present embodiment, if the predetermined condition is satisfied after changing the DeNB while keeping the communication of the RN-UE 3, the RN S/P-GW 8 terminating the bearer for the RN 2 is changed. For example, as shown in the above specific example, if the condition that the number of DeNBs through which the bearer for the RN 2 passes is greater than or equal to a predetermined value is satisfied, the termination point of the bearer for the RN 2 is changed from the RN S/P-GW 8 placed in the source DeNB 1-1 to the RN S/P-GW 8 placed in the target DeNB 1-2. Thus, the present embodiment can change the RN S/P-GW 8 in such a manner that the change affects the communication quality of the RN-UE 3 to a lesser extent.

The specific examples (FIGS. 18 to 21) of the present embodiment have been described based on the configuration shown in FIG. 3, in which the RN S/P-GW 8 is placed in the base station 1. However, the present embodiment may be applied to a configuration in which the RN S/P-GW 8 is placed in the core network 4 as shown in FIG. 14. Specifically, the present embodiment may be applied to a case in which the relay station 2, belonging to the base station 1 connected to a first RN S/P-GW placed in the core network 4, changes the belonging destination thereof to a base station connected to a second RN S/P-GW placed in the core network 4. In this case, the DeNB to which the RN 2 belongs may be changed while maintaining the termination point of the bearer for the RN 2 at the first RN S/P-GW serving as a mobility anchor point. Subsequently, in response to the predetermined condition being satisfied, the termination point of the bearer for the RN 2 may be changed to the second RN S/P-GW.

Fourth Embodiment

As with the above third embodiment, the present embodiment shows an example in which after the DeNB to which the RN 2 belongs is changed according to the method described in the first embodiment, the RN S/P-GW 8 is changed in response to a predetermined condition being satisfied. Note that the present embodiment shows an example in which the RN S/P-GW 8 is changed in response to determining by the RN 2 that a predetermined condition is satisfied. An example configuration of a mobile communication system according to the present embodiment is similar to that in FIG. 3 described in the first embodiment.

Figure 22:
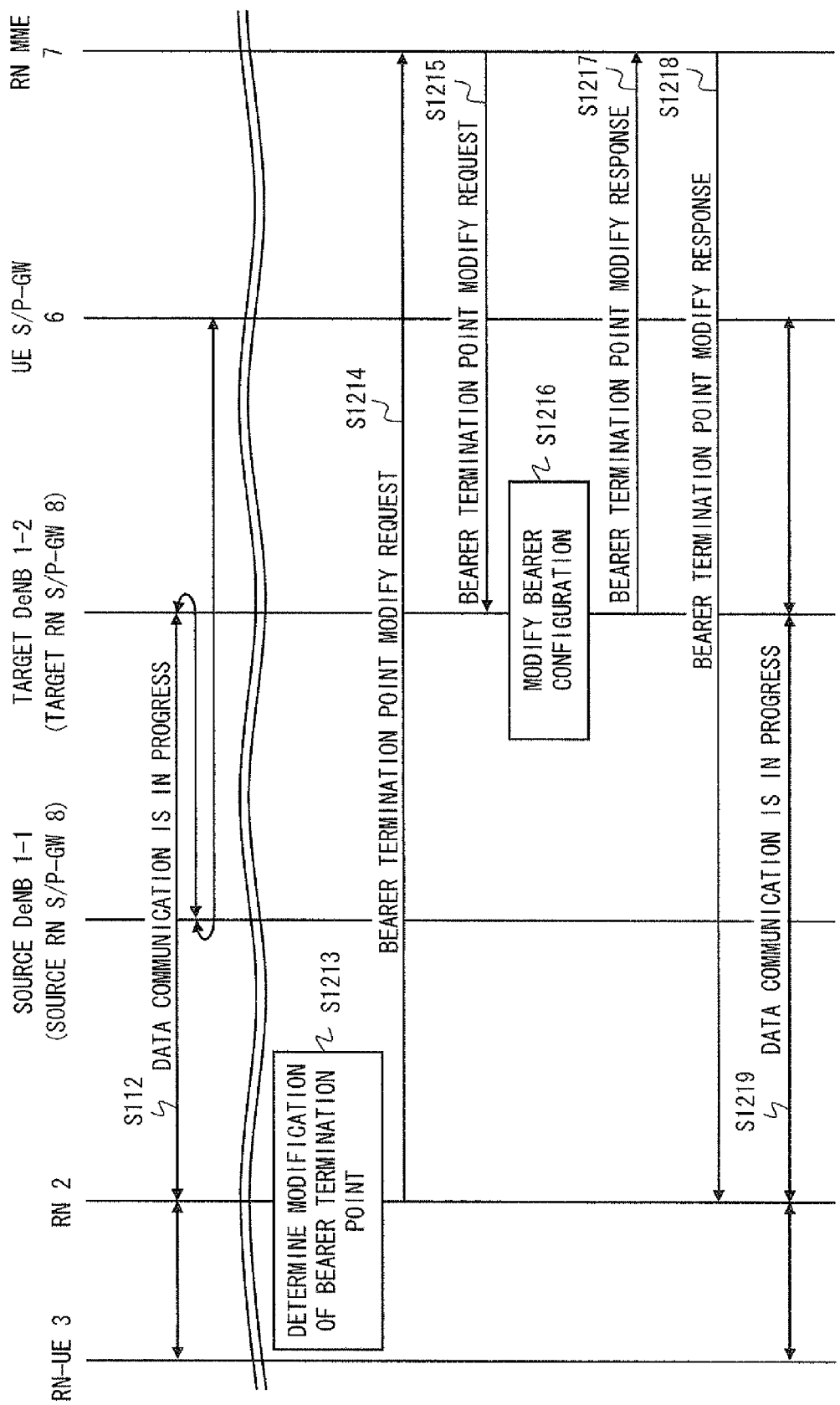
FIG. 22 is a sequence diagram showing an example of a procedure for changing a DeNB according to a fourth embodiment of the present invention.

FIG. 22 is a sequence diagram showing an example of a procedure for changing the RN S/P-GW according to the fourth embodiment. The sequence diagram of FIG. 22 is formed by additionally providing steps S1213 to S1219 for changing the RN S/P-GW 8 after step S112 of the sequence diagram shown in FIG. 4 related to the first embodiment.

In step S1213, the RN 2 decides to change the RN S/P-GW 8 terminating the bearer for the RN 2. The RN 2 sends the bearer termination point modify request to the RN MME 7 (step S1214). The RN MME 7 sends, to the target DeNB 1-2, the bearer termination point modify request including the changed configuration information of the bearer for the RN 2 (step S1215). The target DeNB 1-2 modifies the bearer configuration for the RN 2 in accordance with the received bearer configuration information (step S1216), and sends the bearer termination point modify response to the RN MME 7 (step S1217). The RN MME 7 sends the bearer termination point modify response to the RN 2 (step S1218). After step S1218 in which the RN S/P-GW 8 terminating the bearer for the RN 2 is changed, user data transmitted from the RN-UE 3 in an uplink direction, for example, passes through the RN-UE 3, the RN 2, and the target DeNB 1-2 and finally reaches the UE S/P-GW 6, without through the source DeNB 1-1 (step S1219).

Figure 23:
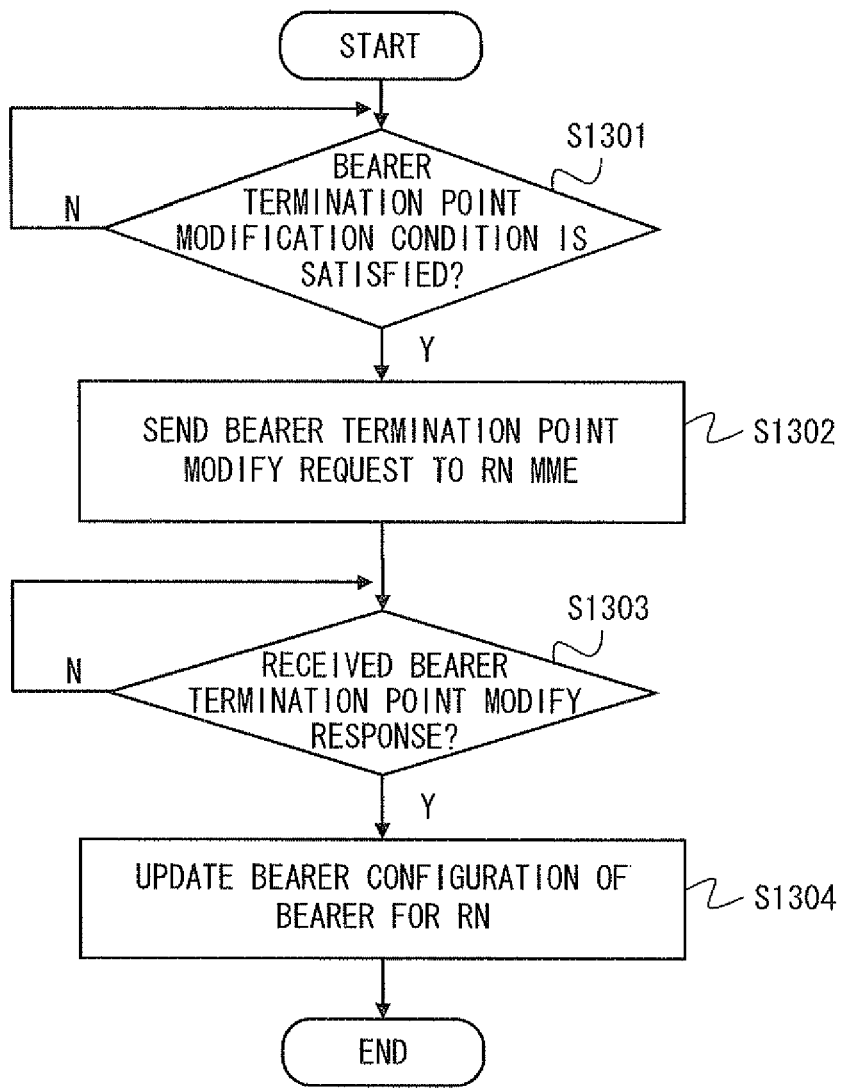
FIG. 23 is a flowchart showing an example operation of a relay station according to the fourth embodiment of the present invention.

FIG. 23 is a flowchart showing an example operation of the RN2 when the RN S/P-GW 8 terminating the bearer for the RN 2 is changed according to the fourth embodiment. In step S1301, the RN 2 determines whether the condition for changing the RN S/P-GW terminating the bearer for the RN 2 is satisfied. If the condition for changing the RN S/P-GW 8 is satisfied, for example, if the number of DeNBs through which the bearer for the RN 2 passes is greater than or equal to the predetermined value (YES in step S1301), the RN 2 sends the bearer termination point modify request to the RN MME 7 (step S1302) and proceeds to step S1303 to wait for the response from the RN MME 7. If the condition for changing the RN S/P-GW 8 is not satisfied (NO in step S1301), the RN 2 returns to step S1301 to determine whether the condition for changing the RN S/P-GW 8 is satisfied. If the RN 2 receives the bearer termination point modify response from the RN MME 7 in step S1303 (YES in step S1003), it updates the configuration of the bearer for the RN 2 (context of an EPS bearer) (step S1304) and ends the operation. If the RN 2 has not received the bearer termination point modify response from the RN MME 7 (NO in step S1303), it returns to step S1303 to again wait for the bearer termination point modify response from the RN MME 7.

Figure 24:
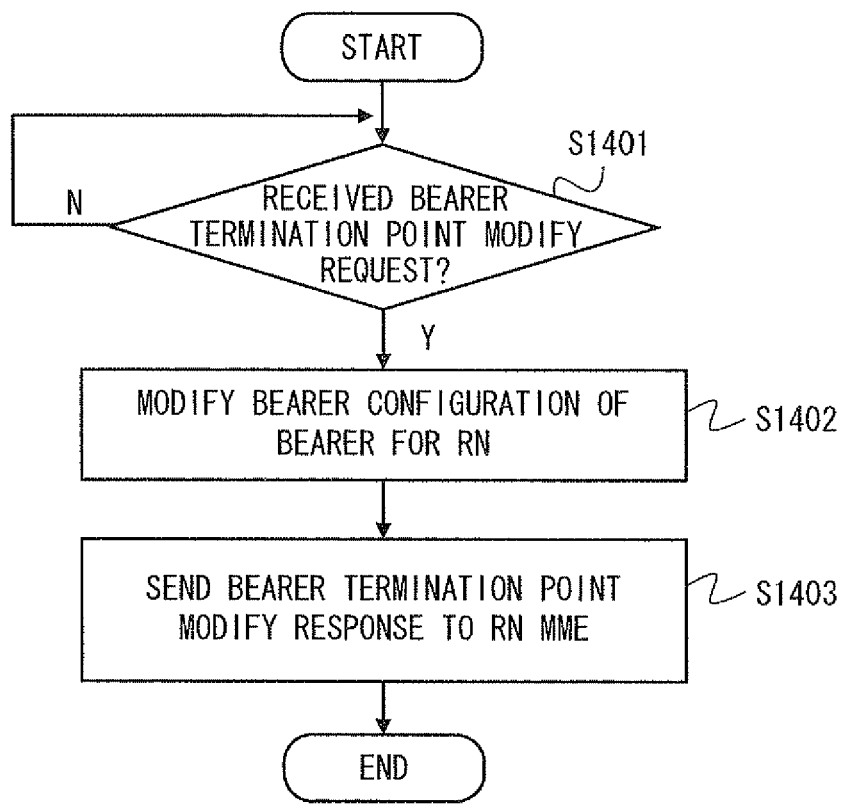
FIG. 24 is a flowchart showing an example operation of a target DeNB according to the fourth embodiment of the present invention.

FIG. 24 is a flowchart showing an example operation of the target DeNB 1-2 when the RN S/P-GW 8 terminating the bearer for the RN 2 is changed according to the fourth embodiment. The procedure starts when the target DeNB 1-2 receives the bearer termination point modify request from the RN MME 7 (step S1401). If the target DeNB 1-2 has received the bearer termination point modify request (YES in step S1401), it updates the configuration of the bearer for the RN 2 in accordance with the bearer configuration information included in the bearer termination point modify request (step S1402). The target DeNB 1-2 sends the bearer termination point modify response to the RN MME 7 (step S1403) and ends the operation. If the target DeNB 1-2 has not received the bearer termination point modify request (NO in step S1401), it returns to step S1401.

The operation of the source DeNB 1-1 according to the present embodiment is similar to that according to the first embodiment, so the detailed description thereof is omitted. The operation of the RN MME 7 is similar to that according to the third embodiment, so the detailed description thereof is omitted. The operation of the mobile station 3 does not differ from a typical operation, so the detailed description thereof is omitted.

The predetermined condition for changing the RN S/P-GW 8 may be based on the radio quality of the backhaul link of the RN 2, the number of RN-UEs 3 connected to the RN 2, or the moving speed of the RN 2.

In the present embodiment, as in the first and second embodiments, even when the relay station (RN) 2 moves between the base stations (DeNB) 1, there is no need to change the RN S/P-GW 8 terminating the data bearer for the RN 2. As a result, it is possible to change the DeNB while keeping communication of the RN-UE 3, without releasing the data bearer for the RN 2 and the signaling bearer and data bearer for RN-UE 3. Further, in the present embodiment, if the predetermined condition is satisfied after changing the DeNB while keeping the communication of the RN-UE 3, the RN S/P-GW 8 terminating the bearer for the RN 2 is changed. As a result, the present embodiment can change the RN S/P-GW 8 in such a manner that the change affects the communication quality of the RN-UE 3 to a lesser extent.

The specific examples (FIGS. 22 to 24) of the present embodiment have been described based on the configuration shown in FIG. 3, in which the RN S/P-GW 8 is placed in the base station 1. However, as described in the third embodiment, the present embodiment may be applied to a configuration in which the RN S/P-GW 8 is placed in core network 4 as shown in FIG. 14.

Other Embodiments

The third and fourth embodiments of the present invention use the number of DeNBs through which bearer for the RN 2 passes, as a specific example of the predetermined condition for changing the RN S/P-GW 8 terminating the bearer for the RN 2. However, the radio quality of the backhaul link of the RN 2, the number of RN-UEs 3 connected to the RN 2, the moving speed of the RN 2, or the like may be used as the predetermined condition for changing the RN S/P-GW 8.

Specifically, if the radio quality of the backhaul link of the RN 2 is used, the RN S/P-GW 8 terminating the RN 2 may be changed in response to the radio quality being higher than or equal to a predetermined level. While the bearer for the RN 2 is reconfigured (while the termination point (RN S/P-GW 8) is modified), the RN 2 cannot perform data communication with the core network 4. For this reason, the RN-UE 3 cannot transmit data to the core network 4, which may result in an increase in delay or interruption of communication of the RN-UE 3. When the radio quality of the backhaul link is high, the RN 2 can perform communication at a low error rate (low re-transmission rate) and at a high data rate. As a result, it is possible to reduce the time required to reconfigure the bearer for the RN 2. Thus, by reconfiguring the bearer for the RN 2 when the radio quality of the backhaul link is relatively high, it is possible to control an increase in delay of data communication of the RN-UE 3 or control the time during which the communication is interrupted.

If the number of RN-UEs 3 connected to the RN 2 is used, the RN S/P-GW 8 may be changed in response to the number of RN-UEs 3 being smaller than or equal to a predetermined number. The total amount of data to be transferred by the RN 2 is believed to depend on the number of RN-UEs 3. Thus, by reconfiguring the bearer for the RN 2 (modifying the termination point (RN S/P-GW 8)) when the number of RN-UEs 3 is small, it increases the chance that the reconfiguration of the bearer can be completed before the buffer for storing uplink transmission data held by the RN 2 becomes full. Accordingly, by reconfiguring the bearer for the RN 2 when the number of RN-UEs 3 is relatively small, the amount of data loss can be reduced.

If the moving speed of the RN 2 is used, the RN S/P-GW 8 may be changed in response to the moving speed of the RN 2 being lower than or equal to a predetermined value. When the moving speed of the RN 2 is high, fast fading degrades the radio quality of the backhaul link and reduces the data rate. In contrast, when the moving speed of the RN 2 is low, fading effects are less significant, which can increase the radio quality and the date rate of the backhaul link. For this reason, by reconfiguring the bearer for the RN 2 (modifying the termination point (RN S/P-GW 8)) when the moving speed of the RN 2 is relatively low, it is possible to reduce the time required to reconfigure the bearer for the RN 2. As a result, it is possible to control an increase in the delay of data communication of the RN-UE 3 or control the time during which the communication is interrupted.

The first to fourth embodiments of the present invention have described the cases where the present invention is applied to a network that supports LTE-type RNs. However, the application of the present invention is not limited to base stations that support LTE-type RNs. Specifically, the present invention is also applicable to cases where a network includes a relay station which is connected to a base station, whether wirelessly or through a fixed line, and in which data transferred by the base station is terminated by the relay station.

The processes performed by the source DeNB 1-2, the target DeNB 1-2, the RN 2, the RN MME 7, and the RN S/P-GW 8 with respect to the procedures for changing the DeNB to which the RN 2 belongs and the procedures for changing the RN S/P-GW 8 terminating the bearer for the RN 2 described in the first to fourth embodiments may be implemented by semiconductor processing devices, such as an application specific integrated circuit (ASIC) or a digital signal processor (DSP). Alternatively, these processes may be implemented by causing a computer, such as a microprocessor, to execute a program. Specifically, a program including instructions for causing a computer to execute the algorithm shown in at least one of FIGS. 10 to 13, 16, 17, 19 to 21, and 23 to 24 may be generated and the program may be provided to the computer.

This program can be stored in various types of non-transitory computer-readable media and then provided to a computer. Such non-transitory computer-readable media include various types of tangible storage media, for example, magnetic storage media (e.g. flexible disks, magnetic tapes, hard disk drives), magneto-optical storage media (e.g. magneto-optical disks), compact disc read-only memories (CD-ROMs), CD-Rs, CD-R/Ws, semiconductor memories (e.g. mask ROMs, programmable ROMs (PROMs), erasable PROMs (EPROMs), flash ROMs, and random access memories (RAMs). Alternatively, the program may be provided to a computer through various types of transitory computer-readable media. Examples of the transitory computer-readable media include electric signals, optical signals, and electromagnetic waves. Transitory computer-readable media can provide the program to a computer through a wired communication line, such as electric wires or optical fibers, or through a wireless communication line.

The first to fourth embodiments of the present invention can be combined as appropriate. Of course, the present invention is not limited to the above embodiments, and various changes can be made thereto without departing from the spirit and scope of the invention described above.

This application is based upon and claims the benefit of priority from Japanese Patent Application No. 2011-021932, filed on Feb. 3, 2011, the disclosure of which is incorporated herein in its entirety by reference.

REFERENCE SIGNS LIST

1 BASE STATION
2 RELAY STATION
3 MOBILE STATION
4 CORE NETWORK
5 UE MME
6 UE S/P-GW
7 RN MME
8 RN S/P-GW
9 RADIO ACCESS NETWORK
11 RADIO COMMUNICATION UNIT
12 TRANSMISSION DATA PROCESSING UNIT
13 RECEPTION DATA PROCESSING UNIT
14 COMMUNICATION UNIT
15 RELAY STATION CONTROL UNIT
21 LOWER RADIO LINK COMMUNICATION UNIT
22 TRANSMISSION DATA PROCESSING UNIT
23 RECEPTION DATA PROCESSING UNIT
24 UPPER RADIO LINK COMMUNICATION UNIT
25 BACKHAUL LINK CONTROL UNIT
31 RADIO COMMUNICATION UNIT
32 RECEPTION DATA PROCESSING UNIT
33 TRANSMISSION DATA CONTROL UNIT
34 TRANSMISSION DATA PROCESSING UNIT
35 BUFFER UNIT
51 COMMUNICATION UNIT
52 TRANSMISSION DATA PROCESSING UNIT
53 RECEPTION DATA CONTROL UNIT
54 BEARER INFORMATION MANAGEMENT UNIT
61 LOWER APPARATUS COMMUNICATION UNIT
62 TRANSMISSION DATA PROCESSING UNIT
63 RECEPTION DATA CONTROL UNIT
64 UPPER APPARATUS COMMUNICATION UNIT
65 BEARER CONTROL UNIT

The invention claimed is:

1. A mobile communication system comprising:
first and second base stations that are arranged in a radio access network and are connected to a core network;
a relay station that is arranged in the radio access network and is configured to belong to any one of the first and second base stations and to perform radio relay between a mobile station and the first or second base station;
a first data transfer unit that is arranged in the core network and is configured to terminate a mobile-station data bearer provided between the mobile station and the first data transfer unit through the relay station, and to transfer user data to the mobile station using the mobile-station data bearer;
a second data transfer unit that is arranged in the first base station or the core network and is configured to terminate a relay-station data bearer provided between the relay station and the second data transfer unit, and to transfer the user data between the first data transfer unit and the relay station by associating the mobile-station data bearer with the relay-station data bearer; and
a relay-station mobility management unit configured to, when a belonging destination of the relay station is changed from the first base station to the second base station, change a path of the relay-station data bearer, which is terminated by the relay station and the second data transfer unit, so as to pass through the second base station.

2. The mobile communication system according to claim 1, wherein the second data transfer unit is arranged in the core network, and when the belonging destination of the relay station is changed, the relay-station mobility management unit changes the path of the relay-station data bearer by modifying a point through which the relay-station data bearer passes, from the first base station to the second base station.

3. The mobile communication system according to claim 1, wherein the second data transfer unit is arranged in the first base station.

4. The mobile communication system according to claim 3, wherein when the belonging destination of the relay station is changed, the relay-station mobility management unit changes the path of the relay-station data bearer by including the first and second base stations as points through which the relay-station data bearer passes.

5. The mobile communication system according to claim 1, wherein after changing the belonging destination of the relay station from the first base station to the second base station, the relay-station mobility management unit sends control data to the second base station without through the first base station.

6. The mobile communication system according to claim 1, wherein the second data transfer unit transfers control data between mobile-station mobility management unit and the relay station by associating a mobile-station signaling bearer with the relay-station data bearer, wherein the mobile-station signaling bearer being provided between the mobile-station mobility management unit and the relay station in order to manage mobility of the mobile station.

7. The mobile communication system according to claim 1, further comprising third data transfer unit that is configured to terminate the relay-station data bearer,
wherein after changing the path of the relay-station data bearer accompanying the change of the belonging destination of the relay station, the relay-station mobility management unit modifies a termination point of the relay-station data bearer from the second data transfer unit to the third data transfer unit in response to a predetermined condition being satisfied.

8. The mobile communication system according to claim 7, wherein the third data transfer unit transfers control data between the mobile-station mobility management unit and the relay station by mapping the mobile-station signaling bearer to the relay-station data bearer which is terminated by the third data transfer unit.

9. The mobile communication system according to claim 7, wherein
the predetermined condition includes a condition related to the number of mobile stations which are currently connected to the relay station, and
in response to a condition that the number of mobile stations falls below a predetermined level being satisfied, the relay-station mobility management unit modifies the termination point of the relay-station data bearer from the second data transfer unit to the third data transfer unit.

10. The mobile communication system according to claim 7, wherein
the predetermined condition includes a condition related to the number of base stations through which the relay-station data bearer passes, and
in response to a condition that the number of base stations exceeds a predetermined level being satisfied, the relay-station mobility management unit modifies the termination point of the relay-station data bearer from the second data transfer unit to the third data transfer unit.

11. The mobile communication system according to claim 7, wherein
the predetermined condition includes a condition related to moving speed of the relay station, and
in response to a condition that the moving speed falls below a predetermined level being satisfied, the relay-station mobility management unit modifies the termination point of the relay-station data bearer from the second data transfer unit to the third data transfer unit.

12. The mobile communication system according to claim 7, wherein
the predetermined condition includes a condition related to radio communication quality between the relay station and the first base station, and
in response to a condition that the radio communication quality exceeds a predetermined level being satisfied, the relay-station mobility management unit modifies the termination point of the relay-station data bearer from the second data transfer unit to the third data transfer unit.

13. The mobile communication system according to claim 7, wherein the first base station or the second base station determines whether the predetermined condition is satisfied and requests the relay-station mobility management unit to modify the termination point of the relay-station data bearer.

14. The mobile communication system according to claim 7, wherein the relay station determines whether the predetermined condition is satisfied and requests the relay-station mobility management unit to modify the termination point of the relay-station data bearer.

15. A relay-station mobility management apparatus that performs control of a mobile communication network,
wherein the mobile communication network includes:
first and second base stations that are arranged in a radio access network and are connected to a core network;
a relay station that is arranged in the radio access network and is configured to belong to any one of the first and second base stations and to perform radio relay between a mobile station and the first or second base station;
a first data transfer unit that is arranged in the core network and is configured to terminate a mobile-station data bearer provided between the mobile station and the first data transfer unit through the relay station, and to transfer user data to the mobile station using the mobile-station data bearer; and
a second data transfer unit that is arranged in the first base station or the core network and is configured to terminate a relay-station data bearer provided between the relay station and the second data transfer unit, and to transfer the user data between the first data transfer unit and the relay station by associating the mobile-station data bearer with the relay-station data bearer, and
wherein when a belonging destination of the relay station is changed from the first base station to the second base station, the relay-station mobility management apparatus changes a path of the relay-station data bearer, which is terminated by the relay station and the second data transfer unit, so as to pass through the second base station.

16. The relay-station mobility management apparatus according to claim 15, wherein the second data transfer unit is arranged in the core network, and when the belonging destination of the relay station is changed, the relay-station mobility management apparatus changes the path of the relay-station data bearer by modifying a point through which the relay-station data bearer passes, from the first base station to the second base station.

17. The relay-station mobility management apparatus according to claim 15, wherein
the second data transfer unit is arranged in the first base station, and
when the belonging destination of the relay station is changed, the relay-station mobility management apparatus changes the path of the relay-station data bearer by including the first and second base stations as points through which the relay-station data bearer passes.

18. The relay-station mobility management apparatus according to claim 15, wherein after changing the belonging destination of the relay station from the first base station to the second base station, the relay-station mobility management apparatus sends control data to the second base station without through the first base station.

19. The relay-station mobility management apparatus according to claim 15, wherein the mobile communication network further includes third data transfer unit that is configured to terminate the relay-station data bearer, and
wherein after changing the path of the relay-station data bearer accompanying the change of the belonging destination of the relay station, the relay-station mobility management apparatus modifies a termination point of the relay-station data bearer from the second data transfer unit to the third data transfer unit in response to a predetermined condition being satisfied.

20. The relay-station mobility management apparatus according to claim 19, wherein
the predetermined condition includes a condition related to the number of mobile stations which are currently connected to the relay station, and
in response to a condition that the number of mobile stations falls below a predetermined level being satisfied, the relay-station mobility management apparatus modifies the termination point of the relay-station data bearer from the second data transfer unit to the third data transfer unit.

21. The relay-station mobility management apparatus according to claim 19, wherein
the predetermined condition includes a condition related to the number of base stations through which the relay-station data bearer passes, and
in response to a condition that the number of base stations exceeds a predetermined level being satisfied, the relay-station mobility management apparatus modifies the termination point of the relay-station data bearer from the second data transfer unit to the third data transfer unit.

22. The relay-station mobility management apparatus according to claim 19, wherein
the predetermined condition includes a condition related to moving speed of the relay station, and
in response to a condition that the moving speed falls below a predetermined level being satisfied, the relay-station mobility management apparatus modifies the termination point of the relay-station data bearer from the second data transfer unit to the third data transfer unit.

23. The relay-station mobility management apparatus according to claim 19, wherein
the predetermined condition includes a condition related to radio communication quality between the relay station and the first base station, and
in response to a condition that the radio communication quality exceeds a predetermined level being satisfied, the relay-station mobility management apparatus modifies the termination point of the relay-station data bearer from the second data transfer unit to the third data transfer unit.

24. A relay station apparatus that is coupled to the relay-station mobility management apparatus according to claim 19, wherein the relay station apparatus is configured to determine whether the predetermined condition is satisfied and to request the relay-station mobility management apparatus to modify the termination point of the relay-station data bearer.

25. A relay-station mobility control method performed by a relay-station mobility management apparatus that performs control of a mobile communication network,
wherein the mobile communication network includes:
first and second base stations that are arranged in a radio access network and are connected to a core network;
a relay station that is arranged in the radio access network and is configured to belong to any one of the first and second base stations and to perform radio relay between a mobile station and the first or second base station;
a first data transfer unit that is arranged in the core network and is configured to terminate a mobile-station data bearer provided between the mobile station and the first data transfer unit through the relay station, and to transfer user data to the mobile station using the mobile-station data bearer; and
a second data transfer unit that is arranged in the first base station or the core network and is configured to terminate a relay-station data bearer provided between the relay station and the second data transfer unit, and to transfer the user data between the first data transfer unit and the relay station by associating the mobile-station data bearer with the relay-station data bearer, and
wherein the relay-station mobility control method comprises, when a belonging destination of the relay station is changed from the first base station to the second base station, changing a path of the relay-station data bearer, which is terminated by the relay station and the second data transfer unit, so as to pass through the second base station.

26. The method according to claim 25, wherein
the second data transfer unit is arranged in the core network, and
the changing includes, when the belonging destination of the relay station is changed, changing the path of the relay-station data bearer by modifying a point through which the relay-station data bearer passes, from the first base station to the second base station.

27. The method according to claim 25, wherein
the second data transfer unit is arranged in the first base station, and
the changing includes, when the belonging destination of the relay station is changed, changing the path of the relay-station data bearer by including the first and second base stations as points through which the relay-station data bearer passes.

28. The method according to claim 25, wherein the mobile communication network further includes third data transfer unit that is configured to terminate the relay-station data bearer, and
wherein the method further includes, after changing the path of the relay-station data bearer accompanying the change of the belonging destination of the relay station, modifying a termination point of the relay-station data bearer from the second data transfer unit to the third data transfer unit in response to a predetermined condition being satisfied.

29. A non-transitory computer readable medium storing a program for causing a computer to execute a relay-station mobility control method performed by a relay-station mobility management apparatus that performs control of a mobile communication network,
wherein the mobile communication network includes:
first and second base stations that are arranged in a radio access network and are connected to a core network;
a relay station that is arranged in the radio access network and is configured to belong to any one of the first and second base stations and to perform radio relay between a mobile station and the first or second base station;
a first data transfer unit that is arranged in the core network and is configured to terminate a mobile-station data bearer provided between the mobile station and the first data transfer unit through the relay station, and to transfer user data to the mobile station using the mobile-station data bearer; and
a second data transfer unit that is arranged in the first base station or the core network and is configured to terminate a relay-station data bearer provided between the relay station and the second data transfer unit, and to transfer the user data between the first data transfer unit and the relay station by associating the mobile-station data bearer with the relay-station data bearer, and
wherein the relay-station mobility control method comprises, when a belonging destination of the relay station is changed from the first base station to the second base station, changing a path of the relay-station data bearer, which is terminated by the relay station and the second data transfer unit, so as to pass through the second base station.

* * * * *